(12) United States Patent
Inamoto et al.

(10) Patent No.: US 11,002,887 B2
(45) Date of Patent: May 11, 2021

(54) IMAGE DISPLAY APPARATUS, MOVING BODY, AND LENS ARRAY

(71) Applicants: Makoto Inamoto, Kanagawa (JP); Daisuke Ichii, Kanagawa (JP)

(72) Inventors: Makoto Inamoto, Kanagawa (JP); Daisuke Ichii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 315 days.

(21) Appl. No.: 14/603,757

(22) Filed: Jan. 23, 2015

(65) Prior Publication Data

US 2015/0219803 A1    Aug. 6, 2015

(30) Foreign Application Priority Data

Feb. 3, 2014  (JP) .............................. JP2014-018686

(51) Int. Cl.
  *G02B 3/00* (2006.01)
  *G02B 27/01* (2006.01)
  *G02B 27/48* (2006.01)

(52) U.S. Cl.
  CPC ........... *G02B 3/005* (2013.01); *G02B 3/0043* (2013.01); *G02B 27/0101* (2013.01); *G02B 27/48* (2013.01); *G02B 2027/013* (2013.01)

(58) Field of Classification Search
  CPC ........ G02B 3/005; G02B 3/00; G02B 3/0006; G02B 3/0037; G02B 3/0043; G02B 3/0056; G02B 27/0101; G02B 2027/013
  USPC ........................................................ 359/627
  See application file for complete search history.

(56) References Cited

U.S. PATENT DOCUMENTS

| 7,154,675 B2 * | 12/2006 | Ishikawa ............... G02B 3/0062 359/622 |
| 2005/0078367 A1 | 4/2005 | Kamijima |
| 2005/0237615 A1 | 10/2005 | Urey et al. |
| 2008/0112056 A1 | 5/2008 | Raymond et al. |
| 2012/0154920 A1 | 6/2012 | Harrison et al. |
| 2014/0177022 A1 | 6/2014 | Saisho et al. |
| 2015/0070770 A1 * | 3/2015 | Nomoto ............... G02B 3/0043 359/626 |

(Continued)

FOREIGN PATENT DOCUMENTS

| EP | 2746825 A1 | 6/2014 |
| JP | H07-152071 A | 6/1995 |

(Continued)

OTHER PUBLICATIONS

Japanese Office Action for corresponding Japanese Patent Application No. 2018-063537 dated Feb. 27, 2019.

(Continued)

*Primary Examiner* — Jack Dinh
(74) *Attorney, Agent, or Firm* — Harness, Dickey & Pierce, P.L.C.

(57) ABSTRACT

An image display apparatus includes: a light source to emit light; a lens array including a plurality of lenses arranged therein; and an image forming device to form an image with the emitted light on the lens array. The light corresponding to the formed image is transmitted from the lens array to be reflected by a reflective surface to visualize the formed image into a virtual image. At least two of the plurality of lenses of the lens array have curvatures different from each other.

16 Claims, 14 Drawing Sheets

(56) References Cited

U.S. PATENT DOCUMENTS

2015/0355460 A1\* 12/2015 Geloen ................ G02B 27/10
359/630

FOREIGN PATENT DOCUMENTS

| JP | 2000155201 A | 6/2000 |
|---|---|---|
| JP | 2005-70631 A | 3/2005 |
| JP | 2007-523369 A | 8/2007 |
| JP | 2009-111209 | 5/2009 |
| JP | 2010-211065 A | 9/2010 |
| JP | 2011-180541 A | 9/2011 |
| JP | 2013-254031 | 12/2013 |
| WO | WO-2013/153655 A1 | 10/2013 |

OTHER PUBLICATIONS

Japanese Office Action for corresponding Japanese Patent Application No. 2014-018686 dated Oct. 19, 2017.
Extended European Search Report dated May 17, 2018 for corresponding European Application No. 1815486.0.

\* cited by examiner

IMAGE DISPLAY APPARATUS, MOVING BODY, AND LENS ARRAY

CROSS-REFERENCE TO RELATED APPLICATIONS

This patent application is based on and claims priority pursuant to 35 U.S.C. § 119(a) to Japanese Patent Application No. 2014-018686, filed on Feb. 3, 2014, in the Japan Patent Office, the entire disclosure of which is hereby incorporated by reference herein.

BACKGROUND

Technical Field

The present disclosure relates to an image display apparatus, moving body, and lens array. More specifically, the present disclosure relates to an image display apparatus for forming an image by light and visualizing a virtual image of the image formed, a moving body mounting the image display apparatus, and a lens array.

Background Art

For example, JP-2013-254031-A discloses a head-up display apparatus for forming an image by irradiating a microlens array including a plurality of microlenses with laser light modulated in accordance with image information, and visualizing a virtual image of the formed image by way of a transmission reflection member.

SUMMARY

Example embodiments of the present invention include an image display apparatus includes: a light source to emit light; a lens array including a plurality of lenses arranged therein; and an image forming device configured to form an image with the emitted light on the lens array. The light corresponding to the formed image is transmitted from the lens array to be reflected by a reflective surface to visualize the formed image into a virtual image. At least two of the plurality of lenses of the lens array have curvatures different from each other. The image display apparatus may be mounted on a moving body.

Example embodiments of the present invention include a lens array, in which at least two of a plurality of lenses of the lens array have curvatures different from each other.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1A:
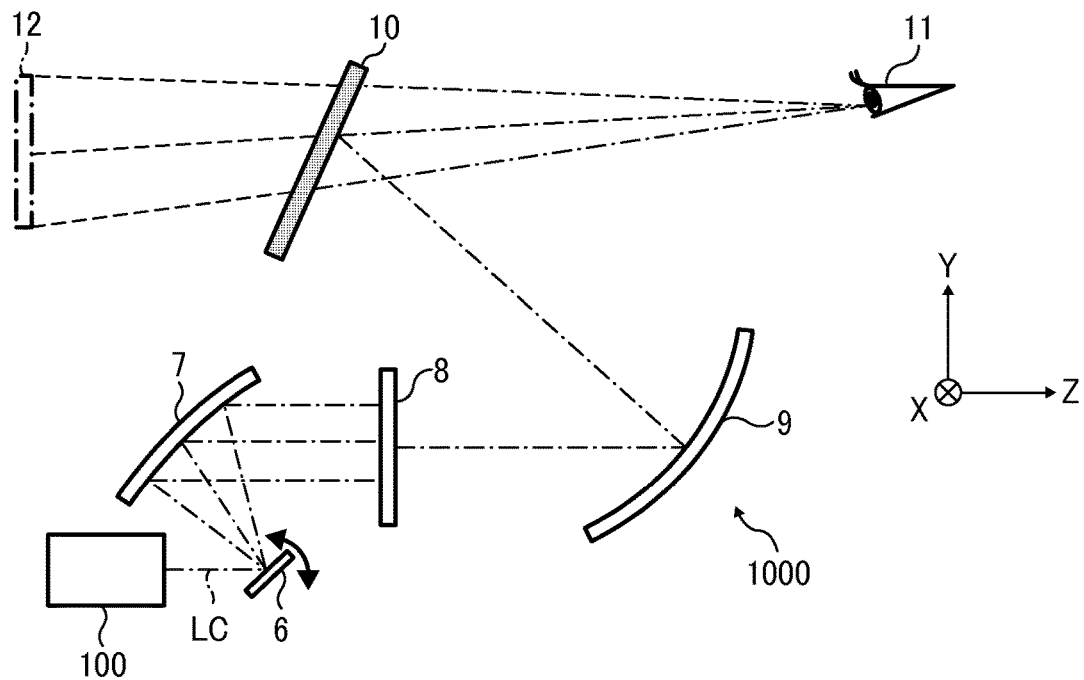
FIGS. 1A to 1C are explanatory diagrams of an image display apparatus according to one embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF THE INVENTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

One embodiment is described below.

Figure 1B:
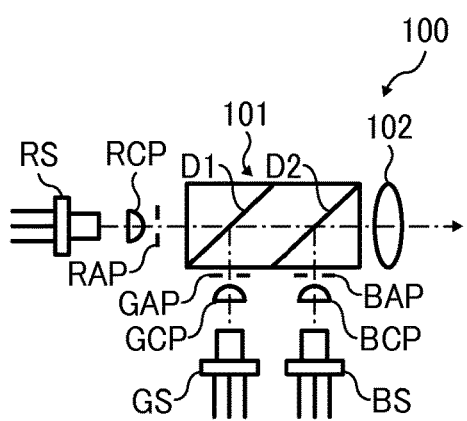
Figure 1C:
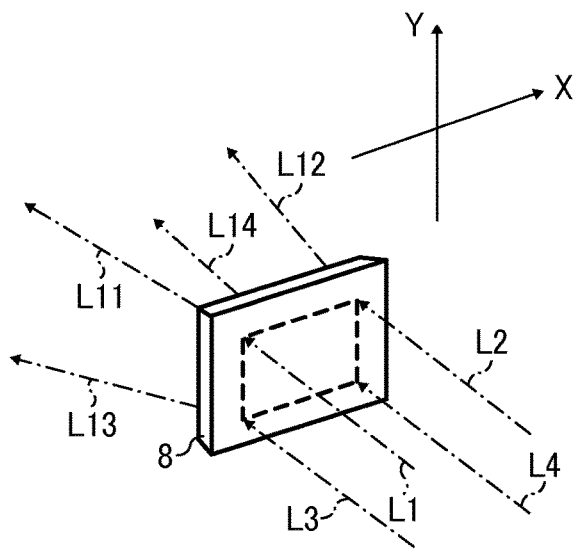

FIGS. 1A to 1C are explanatory diagrams of an image display apparatus according to one embodiment.

An image display apparatus 1000 described with reference to FIGS. 1A to 1C is a head-up display apparatus to display two-dimensional color images. FIG. 1A depicts the overall apparatus in an illustrative manner.

As one example, the image display apparatus 1000 is mounted on a moving body such as a vehicle, airplane, and vessel, and visualizes navigation information used for operating the moving body (e.g., information including speeds and running distances) by way of a transmission reflection member (e.g., a windshield) disposed on the moving body. Description is given below by appropriately using a XYZ three-dimensional orthogonal coordinate system, i.e., a coordinate system to move together with the moving body, that is set in the moving body. It is to be noted that the "transmission reflection member" denotes a member for transmitting a portion of incident light and reflecting at least a portion of the remaining portion.

In FIG. 1A, a pixel-displaying beam LC for displaying a color image is emitted from a light source 100 in positive Z direction.

Beams of three colors of red (hereinafter indicated by "R"), green (hereinafter indicated by "G"), and blue (hereinafter referred to as "B") are combined into one beam, i.e., the pixel-displaying beam LC.

FIG. 1B depicts one exemplary configuration of the light source 100.

In FIG. 1B, semiconductor lasers serving as light sources indicated by RS, GS, and BS radiate laser light of R, G, and B, respectively. Herein, laser diodes (LD) also referred to as edge-emitting lasers are used as the semiconductor lasers. It is to be noted that vertical cavity surface emitting lasers (VCSEL) may be used for the semiconductor lasers in place of edge-emitting lasers.

Coupling lenses RCP, GCP, and BCP suppress divergence of the laser light beams emitted from the semiconductor lasers RS, GS, and BS.

The laser light flux beams of these colors whose divergence is suppressed by the coupling lenses RCP, GCP, and BCP are shaped through apertures RAP, GAP, and BAP, i.e., the diameters of the light flux beams are regulated.

The shaped laser flux beam of each color is incident on a beam combining prism 101.

The beam combining prism 101 has a dichroic film D1 to transmit R color light and reflect G color light, as well as a dichroic film D2 to transmit R color light and G color light and reflect B color light.

Hence, the beam combining prism 101 emits laser light flux beams of R, G, and B colors combined into one light flux beam.

The emitted light flux is converted to a "parallel beam" of a predetermined light flux diameter by a lens 102.

The "parallel beam" is the pixel-displaying beam LC.

The laser light flux beams of R, G, and B colors including the pixel-displaying beam LC are modulated in intensity by image signals of "a two-dimensional color image" to be displayed, i.e., in accordance with image information (image data). The intensity modulation may be of a direct modulation system in which the semiconductor lasers are directly modulated, or of an external modulation system in which laser light flux emitted from the semiconductor lasers is modulated.

In other words, the semiconductor lasers RS, GS, and BS are modulated in emission intensity by the respective image signals of R, G, and B color components.

The pixel-displaying beam LC emitted from the light source 100 is incident on a two-dimensional deflector 6 serving as an image forming device and is deflected two-dimensionally thereby.

The two-dimensional deflector 6 is a microscopic mirror to swing with respect to "two mutually orthogonal axes" as swinging axes.

In other words, the two-dimensional deflector 6 is specifically a micro electro mechanical systems (MEMS) fabricated as a microscopic swinging mirror device by way of, for example, a semiconductor process.

The two-dimensional deflector is not limited to this example and may have other configurations such as a combination of two microscopic mirrors swingable about one axis such that the swinging directions are orthogonal to each other.

The pixel-displaying beam LC two-dimensionally deflected as described above is incident on a concave mirror 7, so as to be reflected toward a scanning target surface 8 such as a microlens array.

An optical effect of the concave mirror 7 is to remove distortion in the image to be formed with the two-dimensionally deflected pixel-displaying beam LC on a reflective surface 10.

In other words, the pixel-displaying beam LC reflected by the concave mirror 7 is incident on the scanning target surface 8 while moving in a parallel direction with the deflection by the two-dimensional deflector 6, so as to nm over the scanning target surface 8 for two-dimensional scanning.

A "color two-dimensional image" is formed on the scanning target surface 8 by this two-dimensional scan.

Displayed on the scanning target surface 8 at each moment are apparently "pixels irradiated with the pixel-displaying beam LC at the moment."

The color two-dimensional image is formed as a "group of pixels displayed at each moment" as a result of the two-dimensional scan with the pixel-displaying beam LC.

As described above, the "color two-dimensional image" is formed on the scanning target surface 8, such that pixel light, which is light in pixel unit of the image information, i.e., light corresponding to each pixel, is incident on a concave mirror 9 to be reflected thereby. The concave mirror 9 functions as a reflective member here.

Although not depicted in FIGS. 1A to 1C, the scanning target surface 8 has a "minute convex lens structure" to be described later. The concave mirror 9 includes a "virtual image forming optical system."

The "virtual image forming optical system" forms an enlarged virtual image 12 of the "color two-dimensional image."

The reflective surface 10 is positioned on the front side of the position at which the enlarged virtual image 12 is formed, so as to reflect the light flux for forming the enlarged virtual image 12 toward an observer 11 (an eye of the observer is depicted in FIG. 1A.) It is to be noted that the observer 11, such as an operator who operates the moving body, sees the virtual image from a predetermined observation location on the optical path of the laser light reflected by the reflective surface 10 (transmission reflection member.)

This reflection light allows the observer 11 to see the enlarged virtual image 12 at the observation location.

As depicted in FIG. 1A, the up-down direction of the figure is indicated as "Y direction," and the direction orthogonal to the figure is indicated by "X direction."

For depiction in FIG. 1A, Y direction is usually the up-down direction for the observer 11 and thus is referred to as a "vertical direction."

Further, X direction is usually the right-left direction for the observer and is thus referred to as a "lateral direction."

The scanning target surface 8 has a minute convex lens structure as described above.

As described later, the minute convex lens structure has "a plurality of minute convex lenses arranged densely at a pitch that is close to a pixel pitch."

The plurality of minute convex lenses here is two-dimensionally arranged at a predetermined pitch along a plane (XY plane) orthogonal to Z direction such that the convex surfaces make a plane of incidence. Specific arrangement modes include a matrix array with rows in X direction and columns in Y direction, and a honeycomb array (zigzag array).

The planar shape of the minute convex lenses, i.e., the shape as viewed in Z-axis direction, is, for example, circular, or regular N-polygonal (N is a natural number not less than three). Individual minute convex lenses have curvatures (radii of curvature) that are equal to each other.

Individual minute convex lenses have a function of diffusing (diffusion function of) the pixel-displaying beam LC isotropically. More specifically, the minute convex lenses have omnidirectionally uniform diffusion power. The "diffusion function" is described briefly below.

FIG. 1C depicts four pixel-displaying beams L1 to L4 incident on the scanning target surface 8.

These four pixel-displaying beams L1 to L4 here are pixel-displaying beams that are incident on four corners of a two-dimensional image to be formed on the scanning target surface 8.

Upon being transmitted by the scanning target surface 8, these four pixel-displaying beams L1 to L4 are converted into forms like beams L11 to L14.

If quadrilateral light flux that has a laterally longer cross section enclosed by the pixel-displaying beams L1 to L4 is made incident on the scanning target surface 8, this light flux becomes "divergent quadrilateral light flux that has a laterally longer cross section enclosed by the beams L11 to L14."

This function of the minute convex lenses is the "diffusion function."

"Divergent light flux enclosed by the beams L11 to L14" is a resultant of temporally grouping pixel-displaying beams thus converted to divergent light flux.

The pixel-displaying beams are diffused in order "for the light flux reflected by the reflective surface 10 to irradiate a wider area in the vicinity of the observer 11 eye."

In case where the diffusion function is not provided, the light flux reflected by the reflective surface 10 irradiates a "smaller area in the vicinity of the observer 11 eye."

For this reason, when the observer 11 moves his/her head and the position of the eye deviates from the "smaller area," the observer 11 becomes unable to see the enlarged virtual image 12.

As described above, the pixel-displaying beam LC is diffused, such that the light flux reflected by the reflective surface 10 irradiates a "wider area in the vicinity of the observer 11 eye."

Hence, even when the observer "moves his/her head a little," he/she reliably sees the enlarged virtual image 12.

As described above, according to the present embodiment, the pixel-displaying beam LC incident on the scanning target surface 8 is a parallel beam, while the beams transmitted by the scanning target surface 8 becomes a divergent beam.

Incidentally, in a scan-type image display apparatus to form an image by scanning a scanning target medium (e.g., a transmissive or a reflective screen) with laser light, speckle noise is generated which makes a to-be-seen virtual image flicker irregularly due to the strong coherence of the laser light, which is coherent light. To deal with this situation, a microlens array (minute convex lens structure) having a plurality of microlenses (minute convex lenses) arranged at a pitch close to the beam diameter of the laser light is used as the scanning target medium in the scan-type image display apparatus. By doing so, the intensity of the speckle noise is reduced while the angle of divergence is controlled at discretion, thus improving the visibility of the virtual image.

However, with microlens arrays in existing scan-type image display apparatuses, the radii of curvature of the microlenses are uniform, and the angle of divergence of the laser light becomes equal regardless of the position on the microlens array on which the laser light is incident. In case of such a design concept, the curvatures (the radii of curvature) of the microlenses are set to a value corresponding to the largest angle of divergence of angles of divergence desired at in-plane positions of the microlens array. As a result, the angle of divergence becomes lamer than intended in certain in-plane areas of the microlens array, lowering the light use efficiency and brightness.

In view of this, according to the present embodiment, at least two curvatures of the plurality of microlenses (minute convex lenses) are set to be different from each other.

More specifically, according to the present embodiment, the microlens array (minute convex lens structure) is provided with radii of curvature of two types or more. In addition, radii of curvature are distributed in in-plane directions of the microlens array. In this manner, a sufficient (minimum) angle of divergence (desired angle of view) is attained at the in-plane positions, and the light use efficiency and brightness are improved. It is to be noted that description is given in detail later of the in-plane distribution of the radii of curvature within the microlens array.

The scanning target surface 8 according to embodiments of the present invention has the "minute convex lens structure" having a plurality of minute convex lenses for diffusing the pixel-displaying beam LC arranged densely at a pitch close to the pixel pitch.

The minute convex lenses are larger than the "beam diameter of the pixel-displaying beams LC."

The minute convex lenses are larger than the "beam diameter of the pixel-displaying beam LC" in order to reduce coherence noise. This is described below with reference to FIGS. 2A and 2B and FIGS. 3A to 3C.

Figure 2A:
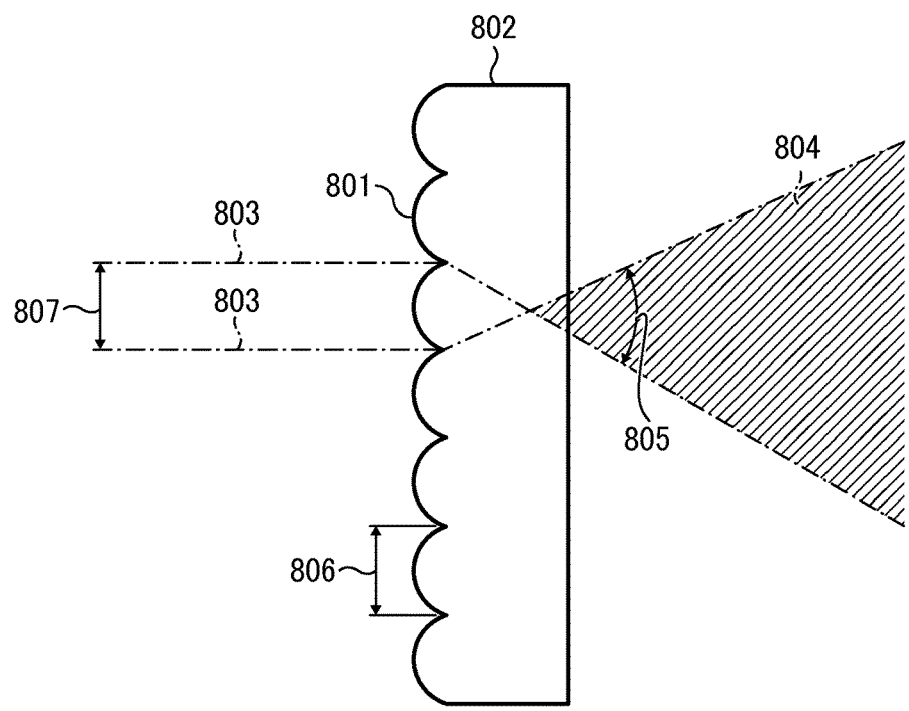
FIGS. 2A and 2B are explanatory diagrams of occurrence of diffusion caused by minute convex lenses and coherent noise.

FIG. 2A depicts a scanning target surface 802.

The scanning target surface 802 has a minute convex lens structure having minute convex lenses 801 arranged therein.

A "pixel-displaying beam" 803 may have a light flux diameter 807 that is smaller than the size of each minute convex lens 801.

In other words, the minute convex lenses 801 have a size 806 that is larger than the light flux diameter 807.

It is to be noted that according to the present embodiment, the pixel-displaying beam 803 is laser light flux and has a distribution of light intensity in Gaussian distribution around the center of the light flux.

Hence, the light flux diameter 807 is a distance in radial direction of the light flux having light intensity in the light intensity distribution to lower to "$1/e^2$."

In FIG. 2A, the light flux diameter 807 is depicted in such a manner as to have a size equal to the size 806 of the minute convex lenses 801. The light flux diameter 807 however may be of a different size from the "size 806 of the minute convex lenses 801."

The size may be any size insofar as the size 806 of the minute convex lenses 801" is not exceeded.

In FIG. 2A, the pixel-displaying beam 803 is incident on one of the minute convex lenses 801 as a whole and is converted to diffused light flux 804 having an angle of divergence 805.

It is to be noted that the "angle of divergence" is also referred to as an "angle of diffusion" below.

In the state of FIG. 2A, the diffused light flux 804 is one in number and does not have interfering light flux, and thus coherent noise (speckle noise) is not generated.

It is to be noted that the magnitude of the angle of divergence 805 is appropriately settable in accordance with the shape of the minute convex lenses 801.

Figure 2B:
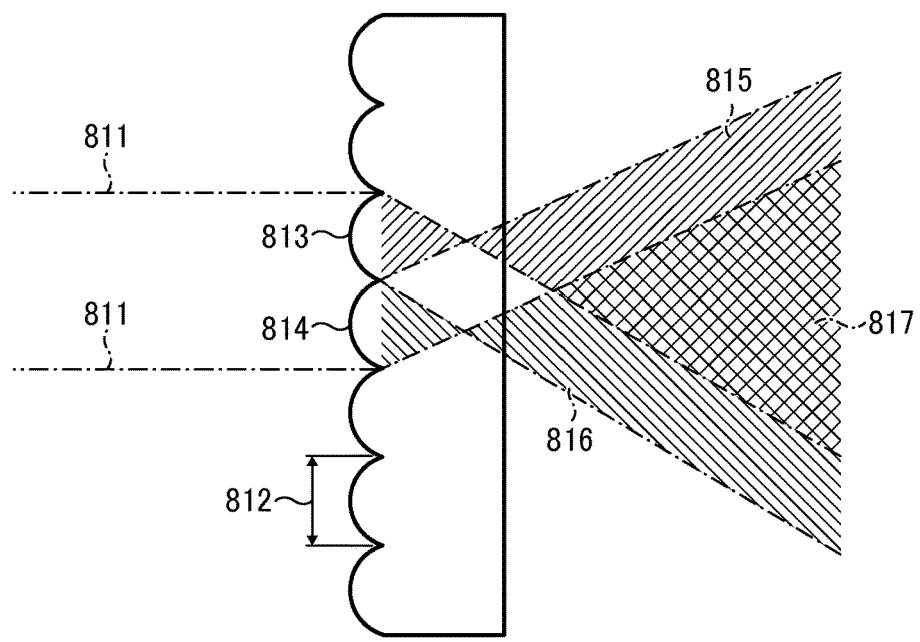

In FIG. 2B, a pixel-displaying beam 811 has a light flux diameter that is twice as large as a pitch 812 at which the minute convex lenses are arranged, and is incident over two minute convex lenses 813 and 814.

In this case, the pixel-displaying beam 811 is diffused by the two minute convex lenses 813 and 814 onto which the beam is incident, into two divergent light flux beams 815 and 816.

The two divergent light flux beams 815 and 816 overlap each other in an area 817 and generate coherent noise by the mutual interference in this portion.

Figure 3A:
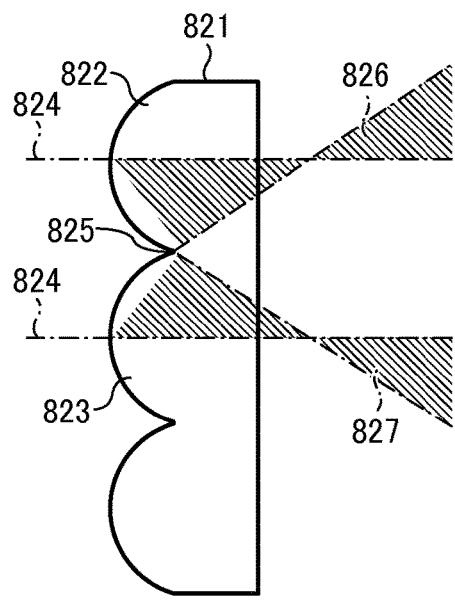
FIGS. 3A to 3C are explanatory diagrams of removal of coherent noise.

FIG. 3A depicts a state in which a pixel-displaying beam 824 incident over two minute convex lenses 822 and 823 of a scanning target surface 821.

The pixel-displaying beam 824 has a light flux diameter that is equal to the size of, for example, a minute convex lens 822.

In this case, the portion of the beam incident on the minute convex lens 822 becomes divergent light flux beam 826, while the portion of the beam incident on a minute convex lens 823 becomes divergent light flux beam 827, upon being diffused.

Since the divergent light flux beams 826 and 827 are diffused in directions that go away from each other, these beams do not overlap with each other, hence not generating coherent noise in this state.

In other words, generation of coherent noise due to the light flux diffused by the minute convex lenses is preventable by setting the beam diameter of the pixel-displaying beam 824 to not larger than the size of the minute convex lens 822.

Specific numerical examples are given with respect to the diameters of the minute convex lenses and the beam diameter of the pixel-displaying beam to be incident on the scanning target surface.

The beam diameter of the pixel-displaying beam is easily set on the order of, for example, 150 μm.

In this case, the size of the minute convex lenses including the minute convex lens structure may be set to a size larger than the above-mentioned 150 μm, such as 160 μm or 200 μm.

The scanning target surface 821 depicted in FIG. 3A includes minute convex lenses 822, 823 . . . arranged without gap.

Hence, the "width of a border portion (hereinafter also referred to as a "border width") between adjacent minute convex lens surfaces is zero."

For this reason, the pixel-displaying beam 824 that is incident on the minute convex lenses 822 and 823 as depicted in FIG. 3A simply generates the divergent light flux beams 826 and 827.

However, in the minute convex lens structure actually configured, the border width between "adjacent minute convex lenses" does not "become zero."

Figure 3B:
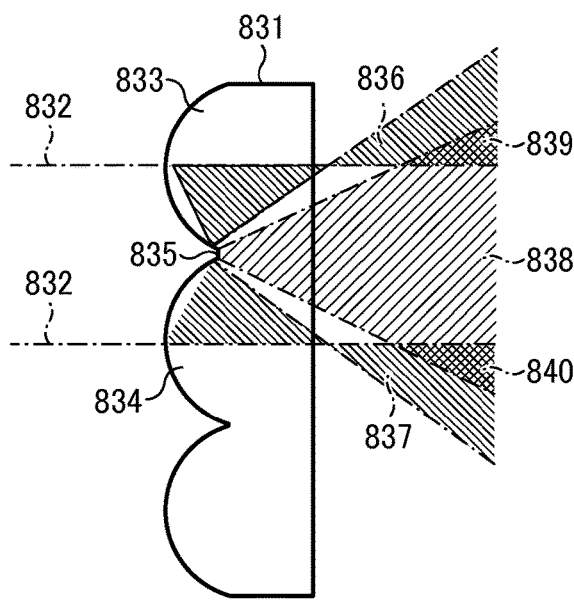

More specifically, in the minute convex lens structure actually configured as a scanning target surface 831 depicted in FIG. 3B, a border portion 835 between minute convex lenses 833 and 834 does not have "a width of zero."

The border portion 835 between the minute convex lenses 833 and 834 microscopically has a "curved surface that is smoothly continuous," and the curved surface is formed in the border portion 835.

The curved surface thus formed in the border portion 835 acts as a "fine lens surface" with respect to a portion of incident light when a pixel-displaying beam is incident on this curved surface portion.

Hence, a pixel-displaying beam 832 incident over the minute convex lenses 833 and 834 generates a divergent light flux beam 838 as well as divergent light flux beams 836 and 837.

The divergent light flux beam 838 is generated by the lens action of the curved surface of the border portion 835 and overlaps and interferes with the divergent light flux beams 836 and 837 in areas 839 and 840, which results in coherent noise.

Figure 3C:
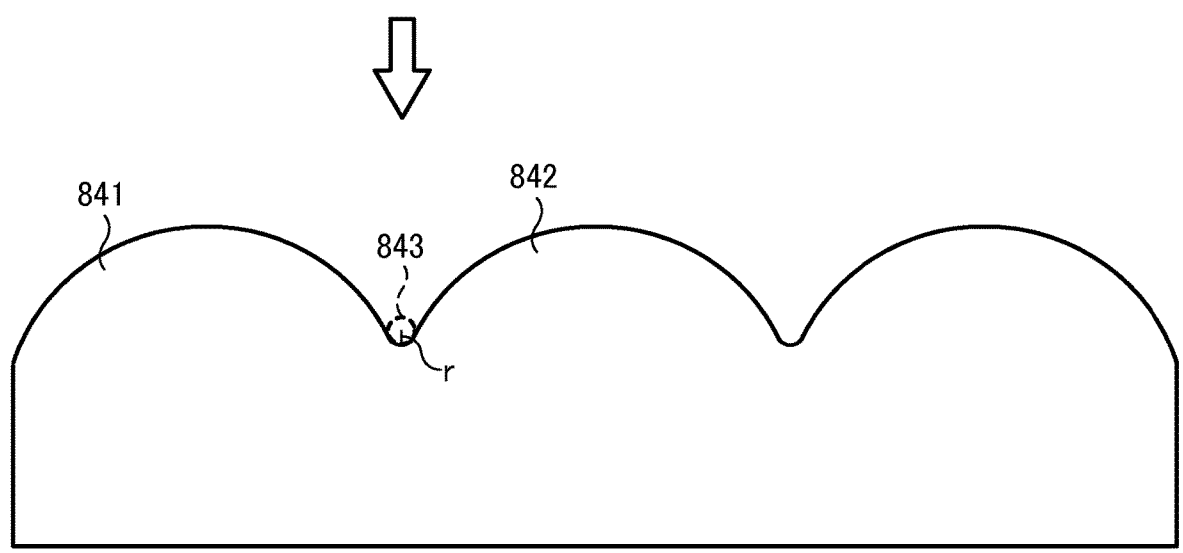

FIG. 3C is an explanatory diagram for describing "reduction and prevention of coherent noise" in the minute convex lens structure.

In the minute convex lens structure, a border portion 843 where the lens surfaces of minute convex lenses 841 and 842 smoothly join each other configures a "fine lens surface" itself.

The curved surface shape of the border portion 843 has radius of curvature "r" as indicated in the figure.

To facilitate the description, the pixel-displaying beam incident on the minute convex lens structure here is single color laser light flux of "wavelength $\lambda$."

In case where radius of curvature r of the border portion 843 is larger than wavelength $\lambda$ of the pixel-displaying beam ($r>\lambda$), the curved surface with radius of curvature r has a lens action on the pixel-displaying beam to be incident thereon.

Hence, in this case, the portion of the beam passing the border portion 843 overlaps and interferes with light flux diffused by the minute convex lenses 841 and 842, which results in coherent noise.

Meanwhile, where radius of curvature r of the border portion 843 is smaller than wavelength $\lambda$ of the pixel-displaying beam, the border portion 843 comes to be a "subwavelength structure" with respect to the pixel-displaying beam.

As is well known, the subwavelength structure does not produce a lens action on "light of a wavelength larger than the subwavelength structure."

Hence, the border portion 843 with radius of curvature r that is smaller than wavelength $\lambda$ neither acts as a "lens" nor transmits the pixel-displaying beam straightly for divergence.

For this reason, the portion of the beam transmitted straightly by the border portion 843 does not overlap with the divergent light flux diffused by the minute convex lenses 841 and 842, and thus coherent noise is not generated due to interference.

More specifically, the relationship of magnitude among beam diameter d and wavelength $\lambda$ of the pixel-displaying beam, size D of the minute convex lenses, and radius of curvature r of the surface configuring the border portion is desirably set as follows:

$D>d$, $\lambda>r$.

In case where the two-dimensional enlarged virtual image to be displayed is a monochrome image, the pixel-displaying beam includes single color coherent light of wavelength $\lambda$.

Hence, in this case, the above D, d, r, and $\lambda$ are set to satisfy the above relationship of magnitude, thus suppressing coherent noise.

As in the present embodiment, in case where a two-dimensional color image (enlarged virtual image) is to be displayed, the pixel-displaying beam LC is a combination of beams of the three colors, R, G, and B.

Provided that the wavelengths of these three beams are $\lambda R$ (=640 nm), $\lambda G$ (=510 nm), and $\lambda B$ (=445 nm), the relationship of magnitude of these is represented as "$\lambda R>\lambda G>\lambda B$."

Hence, from the viewpoint of prevention of coherent noise, radius of curvature r of the surface configuring the above-described border portion may be set smaller than the minimum wavelength $\lambda B$, for example, to 400 nm.

However, setting radius of curvature r smaller than the largest wavelength λR, for example, to 600 nm, allows for prevention of coherent noise due to R components of the pixel-displaying beam.

In other word, coherent noise is effectively reduced.

Where "r (for example, 500 nm)<λG," coherent noise due to the light including R components and G components of the pixel-displaying beam is prevented.

In case where the pixel-displaying beam LC is a "combination of beams of the three colors, R, G, and B," coherent noise is generated independently for these three-color components.

The independent coherent noises for the beams of three colors, R, G, and B, "as a whole" become perceivable coherent noise.

Hence, removal of coherent noise of at least one of the three colors significantly improves perceivable coherent noise, thus contributing enhancement of image quality of the observed image.

Accordingly, even "R components of the longest wavelength" of the three colors have an effect in preventing coherent noise, and the "reduction effect" increases in the order of G components and B components.

Hence, setting radius of curvature r smaller than the longest wavelength λR, for example, to 600 nm helps achieve a certain level of effect in respect of reduction in coherent noise.

The visibility of coherent noise is generally higher in the order of R≈G>B, although the noise intensity varies depending on the wavelength and the beam diameter, or a multimode/single mode.

In other words, light of wavelength λB is less perceptive to human eyes, and coherent noise tends to be less conspicuous.

Hence, setting radius of curvature r smaller than wavelength λG, for example, to 500 nm, allows for reduction of coherent noise due to light of relatively highly visible wavelengths λR and λG.

Even when coherent noise is generated due to light of less visible wavelength λB, such noise is not so conspicuous.

Obviously, setting radius of curvature r smaller than wavelength λB, for example, to 400 nm, reduces coherent noise even more effectively, as described above.

The plurality of minute convex lenses including the minute convex lens structure each has a size on the order of 100 μm as described above, and this size is achievable as typical "microlenses."

Further, the minute convex lens structure having the plurality of minute convex lenses arranged therein is achievable as a "microlens array."

Hence, the minute convex lenses are hereinafter also referred to as "microlenses," and the minute convex lens structure is also referred to as a "microlens array."

The microlens array is generally fabricated in such a manner that a mold with a surface for transferring a lens surface array of the microlens array is fabricated, and that this mold is used to transfer the mold surface to a resin material.

Known methods for forming the transfer surface on the mold include a method using cutting or photolithography.

The transfer of the transfer surface to a resin material is conducted by, for example, "injection molding."

Reduction in radius of curvature at the border portion between adjacent microlenses is achieved by reducing the border width.

The smaller border width is achieved by sharpening the border portion configured by adjacent microlens surfaces.

Various machining methods are known to reduce the size of the "border width between adjacent microlenses" in a mold for the microlens array.

For example, Japanese Patent No. 4,200,223 discloses a method of removing a non-lens portion of a border portion by increasing the radius of curvature of each microlens through anisotropic etching and ion machining.

Further, Japanese Patent No. 5,010,445 describes a method of removing a flat surface between adjacent microlenses by using isotropic dry etching.

For example, these known methods are used to fabricate a microlens array that has a surface configuring the border portion between adjacent microlenses with a sufficiently small radius of curvature.

In other words, the above-described scanning target surface may be configured as a microlens array having a structure in which a plurality of microlenses are arranged close to each other.

Coherent noise due to R-component light is prevented by the configuration of the microlens array having each surface configuring the border portion between adjacent microlenses with radius of curvature r that is smaller than 640 nm.

Further, coherent noise due to R-component light and G-component light is prevented by the configuration of the microlens array having radius of curvature r that is smaller than 510 nm.

Coherent noise caused by R-, G- and B-component light is prevented by the configuration of the microlens array having each surface configuring the border portion between adjacent microlenses with radius of curvature r that is smaller than 445 nm.

In the foregoing, description is given of the image display apparatus (head-up display apparatus) depicted in FIGS. 1A to 1C.

The concave mirror 7 depicted in FIGS. 1A to 1C has a "function of removing distortion in an image to be formed on the reflective surface 10 by the two-dimensionally deflected pixel-displaying beam LC."

More specifically, the concave mirror 7 functions as a "deflection range regulator for adjusting the deflection range of the two-dimensionally deflected pixel-displaying beam and regulating the scanning range of the scanning target surface."

Such a deflection range regulator may be eliminated in case of a negligible angle of deflection of the pixel-displaying beam that is two-dimensionally deflected by the two-dimensional deflector 6.

Conditions for the minute convex lens structure (microlens array) and the minute convex lenses (microlenses) are as described above.

More specifically, "a plurality of minute convex lenses larger than the beam diameter of the pixel-displaying beam is arranged densely at a pitch that is close to the pixel pitch to configure the minute convex lens structure."

Figure 4A:
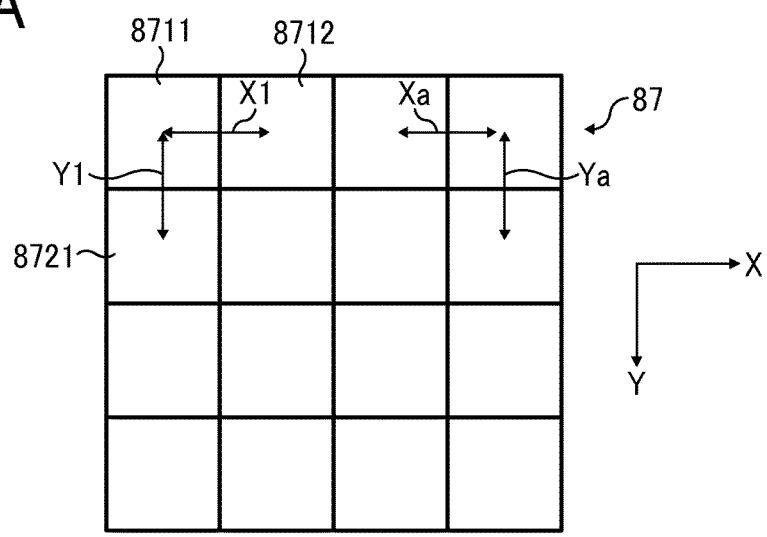
FIGS. 4A to 4C depict exemplary array modes of minute convex lenses.
Figure 4B:
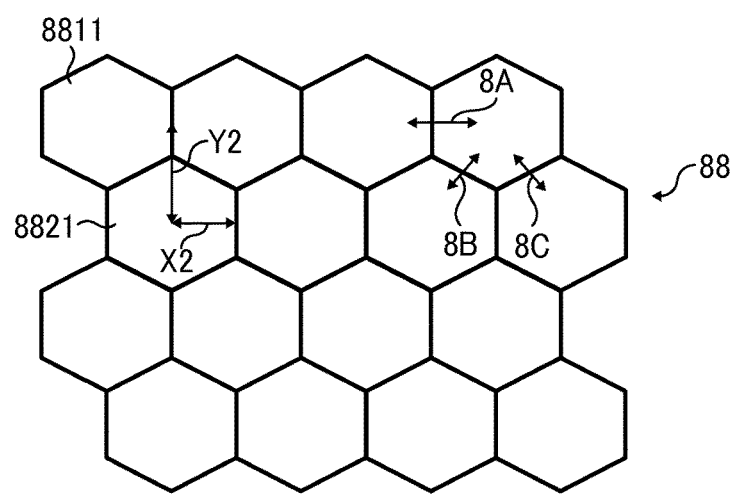
Figure 4C:
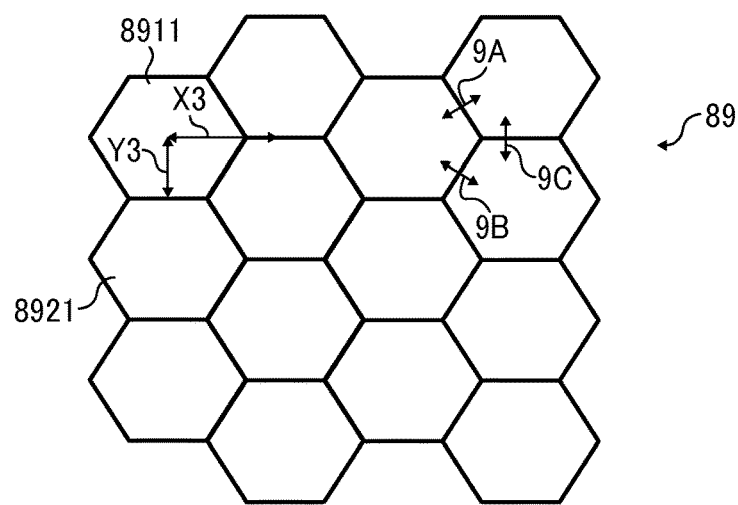

Three specific exemplary modes of the microlens array satisfying such conditions are depicted in FIGS. 4A to 4C.

A microlens array 87 of which a mode example is depicted in FIG. 4A has square-shaped microlenses 8711, 8712, ... arranged in a square matrix.

The number of pixels of a two-dimensional image (enlarged virtual image) to be displayed on the head-up display apparatus is decided by an arrangement period of the microlenses in the microlens array.

In case of the array of FIG. 4A, the centers of the microlenses 8711 and 8712 next to each other in X-axis direction are at a distance X1.

Further, in the figure, the centers of the microlens 8711 and a microlens 8721 next to each other in Y-axis direction are at a distance Y1. These X1 and Y1 may be considered as an "effective size of one pixel."

The "effective size of one pixel" is hereinafter also referred to as an "effective pitch of one pixel" or "effective pixel pitch."

A microlens array 88 of which an exemplary mode is depicted in FIG. 4B has a regular hexagonal microlenses 8811, 8821, . . . thickly arranged therein.

In the array of microlenses in this case, the arranged microlenses including the microlens 8811 do not have parallel sides in X-axis direction.

In other words, the upper side and lower side of the microlenses arranged in X-axis direction make a "zigzag shape," and thus such an array is referred to as a "zigzag array."

A microlens array 89 of which an exemplary mode is depicted in FIG. 4C has a regular hexagonal microlenses 8911, 8921, . . . thickly arranged therein.

In the array of microlenses in this case, the arranged microlenses including the microlens 8911 have parallel sides in X-axis direction. The array in this case is referred to as an "armchair array."

The zigzag array and the armchair array are referred to as a "honeycomb array" collectively.

The zigzag array depicted in FIG. 4B is rotated by 90 degrees to configure the armchair array depicted in FIG. 4C.

In the zigzag array, the array of the microlenses has X2 depicted in the figure that may be considered as an "effective pixel pitch in X-axis direction" and Y2 that may be considered as an "effective pixel pitch in Y-axis direction."

In the armchair array, X3 depicted in the figure may be considered as an "effective pixel pitch in X-axis direction," and Y3 may be considered as an "effective pixel pitch in Y-axis direction."

In FIG. 4B, the effective pixel pitch Y2 is a distance between the center of the microlens 8821 and the middle point of a side on the right of the microlens 8811.

In FIG. 4C, the effective pixel pitch X3 is a distance between the middle point of a side in contact with two microlenses contacting the microlens 8911 at the right side, and the center of the microlens 8911.

In the zigzag array, since the effective pixel pitch X2 in X-axis direction is small, resolution in X-axis direction in image display is improved.

Further, in the armchair array, resolution in Y-axis direction is improved.

In this manner, the microlenses are arranged in a honeycomb shape, such that pixels smaller than the actual lens diameter are effectively rendered and the number of effective pixels is increased.

As described above, in the minute convex lens structure (microlens array) of the scanning target surface, the border portion between adjacent microlenses has radius of curvature r.

Radius of curvature r is, for example, smaller than wavelength λR of R components of the pixel-displaying beam.

Hence, as described earlier, "coherent noise due to interference by R-component coherent light" is prevented.

However, in case where radius of curvature r is larger than wavelength λG of G-component light and wavelength λB of B-component light of the pixel-displaying beam, these light beams are diffused at the border portion and interfere with each other.

Hence, coherent noise is generated due to this interference.

Herein, in case of the "array in a square matrix" in FIG. 4A, divergence (diffusion) at the border portion occurs in two directions, i.e., Xa direction and Ya direction in the figure, each of which could be a cause of coherent noise.

On the other hand, in case of the array of FIG. 4B, diffusion at the border portion occurs in three directions of 8A, 8B, and 8C. Further, in case of FIG. 4C, diffusion occurs in three directions of 9A, 9B, and 9C.

In other words, diffusion at the border portion occurs in two directions in the square matrix array and three directions in the honeycomb array.

Hence, coherent noise is generated in two directions in the square matrix array and three directions in the honeycomb array.

In other words, coherent noise to be generated is "dispersed in two directions" in the square matrix array while being "dispersed in three directions" in the honeycomb array.

Coherent light to cause coherent noise has a constant maximum intensity.

Hence, as the number of dispersions increases, the "contrast of the coherent noise to be generated" is weakened and becomes less visible (less conspicuous.)

Hence, in case where "coherent noise due to components of a wavelength smaller than radius of curvature r of the border portion" is tolerated, the "honeycomb array" is preferably chosen for the array of the microlenses.

It is to be noted that in case where the border width is larger than the above-mentioned wavelength λR, coherent noise due to R-component coherent light is also generated.

However, the "border width between the lens surfaces" of adjacent minute convex lenses is microscopic, and the coherent light to be incident on the portion with the microscopic border width has low light energy.

Hence, the light energy to generate coherent noise is not high either.

Accordingly, even if coherent noise is generated, the above-described dispersion in three directions makes the contrast weaker in case of the honeycomb array.

Hence, visibility of coherent noise is effectively reduced.

As described with reference to FIG. 1A, the virtual image forming optical system to form the two-dimensional enlarged virtual image 12 includes the concave mirror 9.

In other words, the enlarged virtual image 12 is a group of pixel images to be formed by the concave mirror 9.

The diffusion function of the minute convex lenses is exerted differently in directions orthogonal to each other by imparting an anamorphic function to the microlenses, which are minute convex lenses.

Figure 6A:
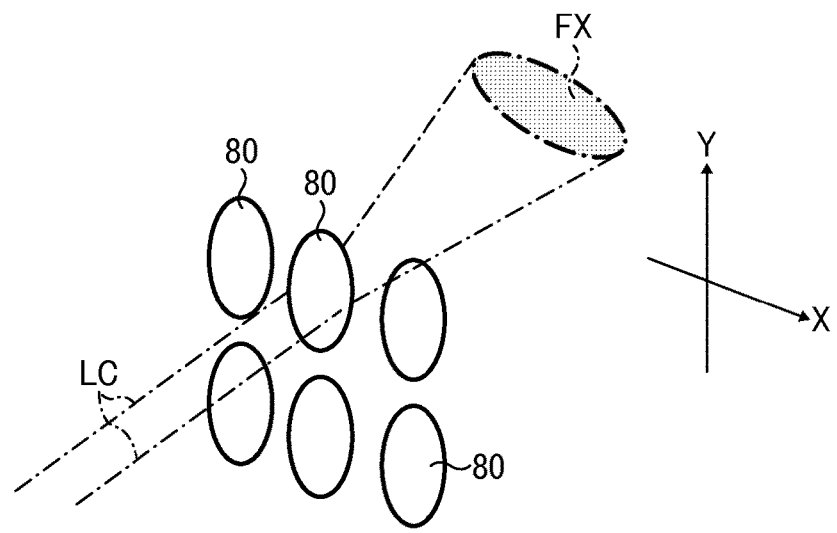
FIGS. 6A and 6B are explanatory diagrams of anamorphic minute convex lenses.
Figure 6B:
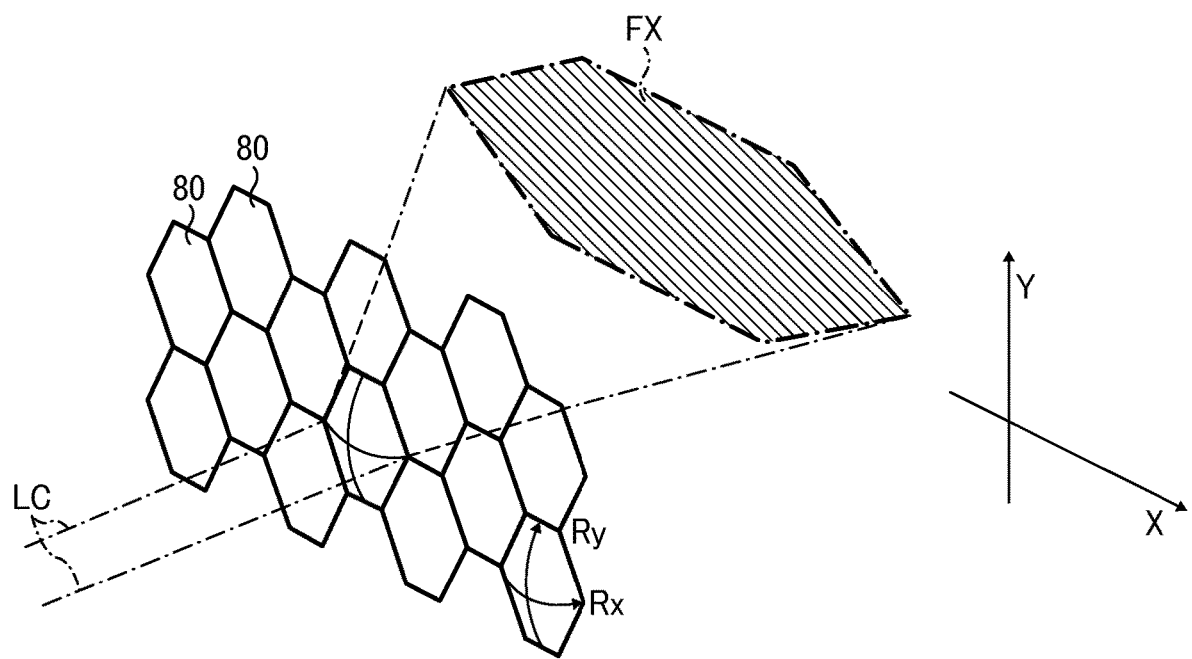

With reference to FIGS. 6A and 6B, microlenses (minute convex lenses) that are thickly provided on the scanning target surface 8 are individually illustrated by the reference numeral 80 in FIGS. 6A and 6B. In the example of FIG. 6A, the minute convex lenses have a vertically longer oval shape and are arranged in a "matrix array."

In the example of FIG. 6B, the minute convex lenses 80 have a vertically longer hexagonal shape with parallel sides in X-axis direction and are arranged in the "armchair array."

The minute convex lenses 80 have radii of curvature of the lens surfaces that are different in X-axis directions and Y-axis direction. Radius of curvature Rx in X-axis direction is smaller than radius of curvature Ry in Y-axis direction. In other words, the minute convex lenses 80 have a larger curvature in X-axis direction than in Y-axis direction.

Hence, the minute convex lenses 80 have power (diffusion power) in X-axis direction that is greater than power (diffusion power) in Y-axis direction.

Further, since curvatures are given both in X-axis direction and Y-axis direction of the lens surfaces, as depicted in FIG. 6B, the minute convex lenses may be shaped hexagonal, and the "visibility of coherent noise" is lowered as described above.

FIGS. 6A and 6B depict a case in which the pixel-displaying beam LC is incident on one of the minute convex lenses 80. In FIGS. 6A and 6B, the individual minute convex lenses 80 have a larger width in Y-axis direction than in X-axis direction.

Further, as depicted in FIG. 6A, the beam diameter of the pixel-displaying beam LC has "an oval shape that is longer in Y-axis direction," and the light flux diameter in Y-axis direction is set smaller than the diameter of the minute convex lenses 80 in Y-axis direction.

In this manner, the pixel-displaying beam LC is allowed to "be incident so as not to cross over a lens border," and the cross-sectional shape of the divergent light flux to be emitted has an oval shape that is longer in X-axis direction (laterally longer.)

Regardless of the length in Y-axis direction and length in X-axis direction of the minute convex lenses, where the curvature in X-axis direction is greater than the curvature in Y-axis direction, the divergent beam to be emitted from each minute convex lens has a light flux cross section FX that is longer in X-axis direction than in Y-axis direction. In other words, the light flux cross section FX is laterally longer.

The head-up display apparatus described above may be, for example, used as an on-vehicle automobile part. In this case, X-axis direction is a "lateral direction as viewed from the driver's seat," and Y-axis direction is a "vertical direction."

The reflective surface 10 in this case is the windshield of an automobile.

In this case, for example, a "navigation image" is displayable as the enlarged virtual image 12 frontward on the windshield, allowing the driver, who is the observer 11, to observe the image while sitting on the driver's seat with the eyes almost fixed.

In such a case, as described above, the enlarged virtual image to be displayed is an "image that is laterally longer as viewed from the driver"; in other words, an image to be formed on the microlenses and an enlarged virtual image are generally desirably images that are larger in angle of view in X-axis direction.

Further, as described above, so as for the driver, who is the observer, to recognize the display even when he/she views a display image diagonally from the right or left, "the angle of view is desirably larger" in the lateral direction "as compared to the vertical direction.

For this reason, the angle of diffusion (anisotropic diffusion) is desirably larger in the longitudinal direction of the enlarged virtual image, i.e., X-axis direction, as compared to the short-length direction, i.e., Y-axis direction.

Accordingly, the minute convex lenses of the scanning target surface are preferably anamorphic lenses that have a larger curvature in the longitudinal direction than in the short-length direction of the image formed on the microlenses or the enlarged virtual image. The angle of diffusion for diverging the pixel-displaying beam is set wider in the "lateral direction than in the vertical direction of the two-dimensional image."

In this manner, light is diverged in a range that is minimum in terms of attaining the desired angle of view of the head-up display apparatus, the light use efficiency is improved, and the brightness of the display image is improved.

Obviously, the above-configuration is achieved not with the "anisotropic diffusion" as described above but with the "isotropic diffusion" in which the angles of diffusion are equal in the vertical direction and the lateral direction.

However, in case of the head-up display apparatus for use as an on-vehicle automobile part, the driver rarely conducts observation from a position in the up-down direction with respect to the display image.

Hence, in such a case, the angle of diffusion for diffusing the pixel-displaying beam is preferably set wider in the "lateral direction than in the vertical direction of the two-dimensional image" in terms of light use efficiency as described above.

As has been known, the minute convex lenses (microlenses) may have an "aspherical" lens "surface."

While the anamorphic lens surface described immediately above is also an "aspherical surface," the lens surfaces of the minute convex lenses may be provided in the form of a more typical aspherical surface, such that aberration correction is performed as well.

Aberration correction allows an "irregularity in intensity of diffusion" to be reduced.

The minute convex lens structures (microlens arrays) depicted in FIGS. 4A to 4C include individual minute convex lenses (microlenses) of square shape or hexagonal shape.

The minute convex lenses may have a shape other than such regular polygonal shapes; for example, the lenses may have a shape that the shape of the microlenses depicted in FIGS. 4A to 4C is elongated in one direction.

In this case, the square shape is modified to a "rectangular shape," and the regular hexagonal shape is modified to an elongate variant hexagonal shape.

In the arrays of FIGS. 4A to 4C, the minute convex lens structures have effective pixel pitches of X1 to X3 in X-axis direction and Y1 to Y3 in Y-axis direction.

Where the effective pixel pitches in X-axis direction thus defined are generally denoted by "SX" and the effective pixel pitches in Y-axis direction are generally denoted by "SY," the ratio of these pitches SY/SX is referred to as an "aspect ratio."

In case of FIG. 4A, the aspect ratio is "Y1/X1." Since X1=Y1, the aspect ratio is one.

The aspect ratio in the case of FIG. 4B is "Y2/X2." Since Y2>X1 the aspect ratio is larger than one.

The aspect ratio in the case of FIG. 4C is "Y3/X3." Since Y3<X3, the aspect ratio is smaller than one.

In the minute convex lens structures of microlens arrays 91 to 95 depicted in FIGS. 5A to 5E, the effective pixel pitches are defined as described below in the same manner as in the case of FIGS. 4A to 4C.

More specifically, the effective pixel pitches in X-axis direction and Y-axis direction are "X11 and Y11," "X12 and Y12," and "X13 and Y13," respectively, in FIGS. 5A to 5E. The minute convex lens structure of FIG. 5A has rectangular minute convex lenses 9111, 9112, . . . 9121, . . . arranged in square matrix, and the aspect ratio is larger than one.

In the microlens arrays 92 to 95 depicted in FIGS. 5B to 5E, the minute convex lens structures thereof are of a honeycomb array.

Figure 5A:
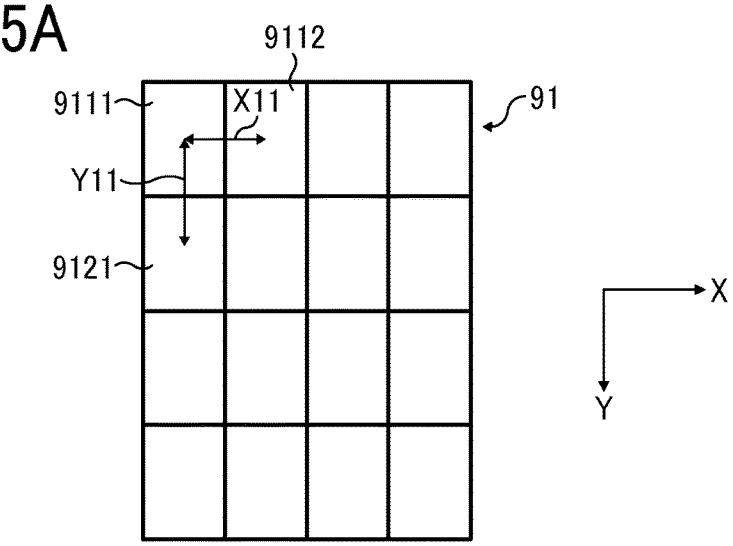
FIGS. 5A to 5E depict other exemplary array modes of minute convex lenses.
Figure 5B:
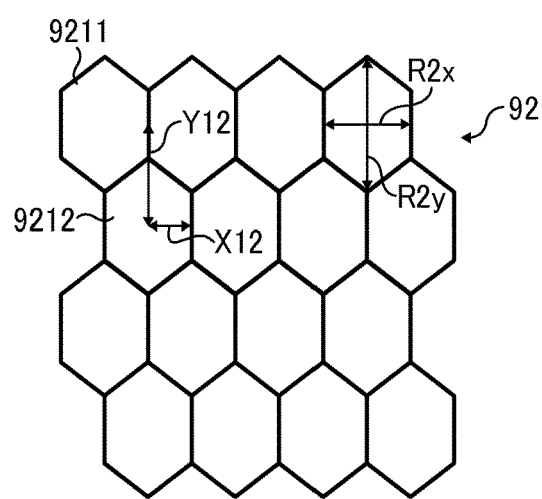
Figure 5C:
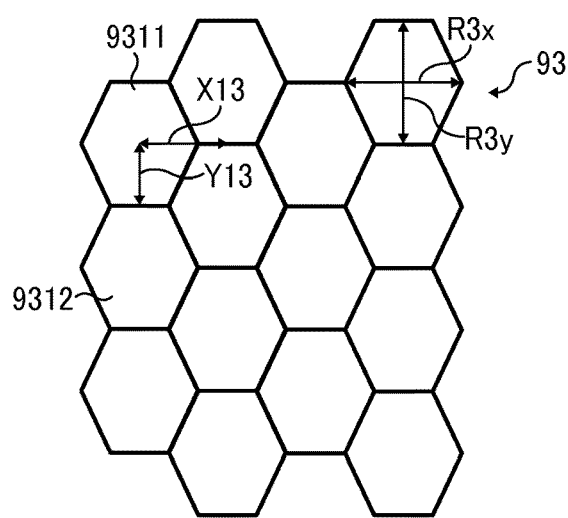
Figure 5D:
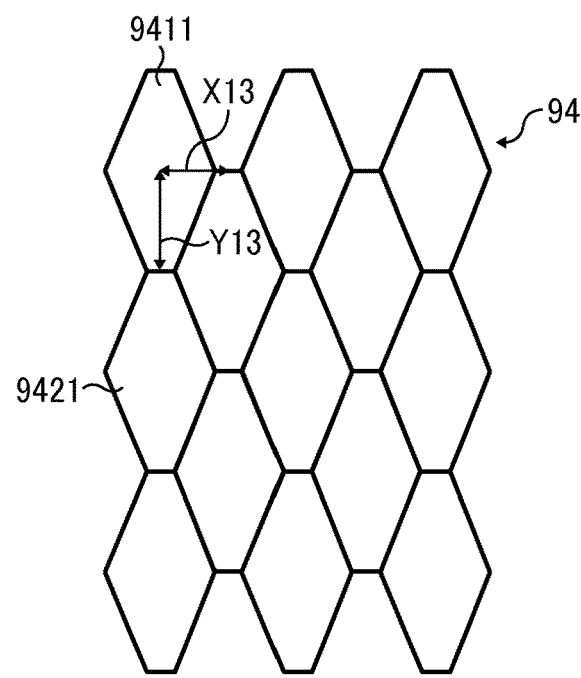
Figure 5E:
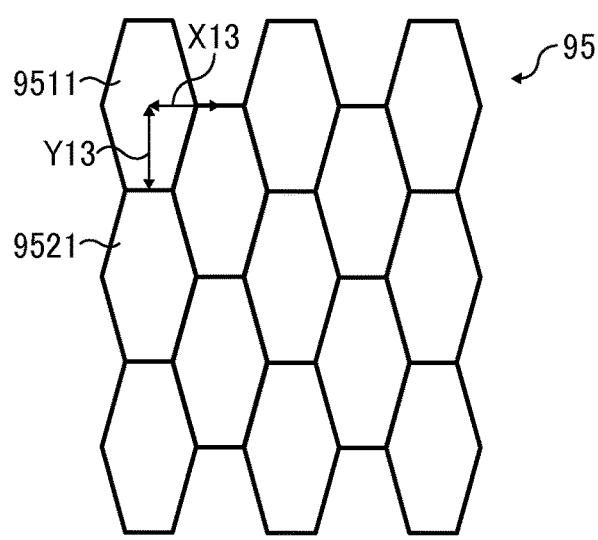

In the honeycomb arrays depicted in FIGS. 5B 5D, and 5E, the aspect ratios "Y12/X12" and "Y13/X13" are both larger than one.

The five examples of the minute convex lens structure depicted in FIGS. 5A to 5E each include "minute convex lenses" that are longer in Y-axis direction than in X-axis direction.

In this manner, in case of the "minute convex lenses having a shape that is longer in Y-axis direction than in X-axis direction," the minute convex lenses are easily shaped by setting the curvature in X-axis direction larger than the curvature in Y-axis direction.

Hence, the earlier-described "anamorphic optical function" is easily achievable "where the power is greater in X-axis direction than in Y-axis direction."

For example, in the case of the example depicted in FIG. 5A, specific examples include X11=150 μm, Y1=200 μm, and the aspect ratio=200/150=4/3>1.

Obviously, in this case, the beam diameter of the pixel-displaying beam is set smaller than 150 μm in X-axis direction and smaller than 200 μm in Y-axis direction.

The arrays of the minute convex lenses depicted in FIGS. 5B to 5D each are of a honeycomb array, and the individual minute convex lenses have a "shape that is longer in Y-axis direction."

The array of FIG. 5B is of a "zigzag type," and the arrays of FIGS. 5C to 5E are of an "armchair type."

The "zigzag type, vertically longer honeycomb array" of FIG. 5B and the "armchair type, vertically longer honeycomb arrays" of FIG. 5C are obviously both adoptable.

However, the exemplary arrays of FIG. 5C are distinctive over the exemplary example of FIG. 5B in the following aspects:

Specifically, the arrays of FIG. 5C has, as compared to the array of FIG. 5B, a smaller "difference in size between X-axis direction and Y-axis direction" of microscopic lenses, and the "difference in effective pixel size" is smaller in the vertical and lateral directions.

Specific dimensions are given.

For example, in FIG. 5B, the lens diameter in X-axis direction of lenses including the minute convex lenses 9211 and 9212 is R2$x$=100 μm, and the lens diameter thereof in Y-axis direction is R2$y$=200 μm.

In this regard, the effective pixel pitch in X-axis direction (=X12) is 50 μm, and the effective pixel pitch in Y-axis direction (=Y12) is 150 μm.

Likewise, in FIG. 5C, the lens diameter in X-axis direction of lenses including the minute convex lenses 9311 and 9312 is R3$x$=100 μm, and the lens diameter thereof in Y-axis direction is R3$y$=200 μm.

Further, the vertical sides of the hexagonal shape of the lenses including the minute convex lens 9311 have a length of 50 μm.

In this regard, the effective pixel pitch in X-axis direction (=X13) is 75 μm, and the effective pixel pitch in Y-axis direction (=Y13) is 100 μm.

Hence, "the effective pixel pitches in X- and Y-axis directions" have "values closer to each other" in the array of FIG. 5C (75 μm and 100 μm) as compared to the case of the array of FIG. 5B (50 μm and 100 μm).

In FIGS. 5C, 5D, and 5E, the effective pixel pitches in X-axis direction are X13, and the effective pixel pitches in Y-axis direction are Y13.

This is because the pixel pitch in X-axis direction and the pixel pitch in Y-axis direction are similarly defined in the honeycomb arrays (armchair type honeycomb arrays) of FIGS. 5C to 5E.

In FIG. 5D, lenses such as minute convex lenses 9411 and 9421 have shorter up-down sides parallel along X-axis direction and longer diagonal sides.

Further, in FIG. 5E, lenses such as minute convex lenses 9511 and 9521 have shorter up-down sides parallel along X-axis direction and longer diagonal sides.

As depicted in these figures, the modified hexagonal shape of the minute convex lenses allows for adjustment of pixel pitch X13 in X-axis direction and pixel pitch Y13 in Y-axis direction.

Like the case of FIG. 5C, the arrays depicted in these FIGS. 5D and 5E have a "vertically longer minute convex lens structure," and thus "equalization of effective pixel pitches" in X- and Y-axis directions is achievable.

Figure 8:
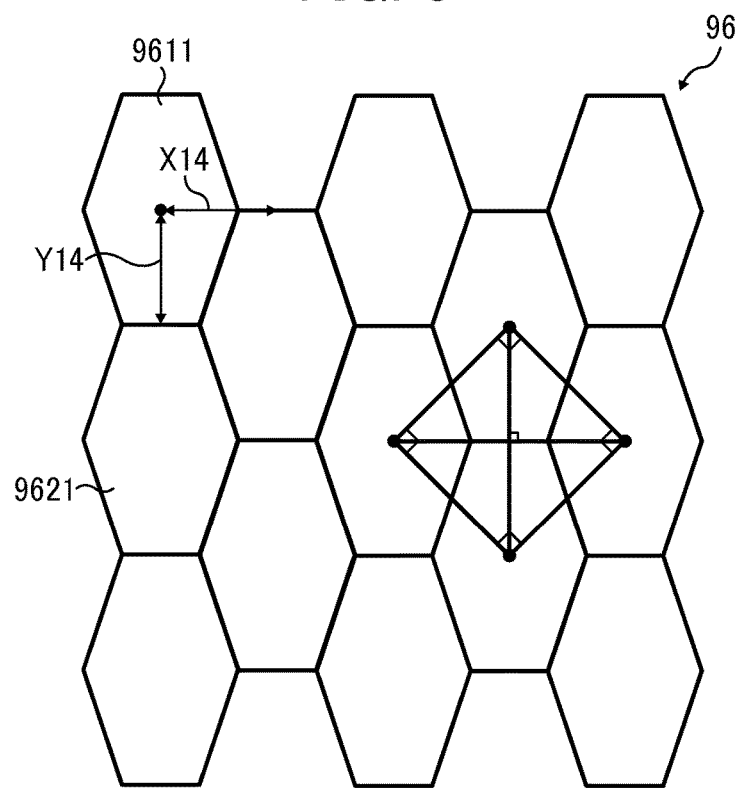
FIG. 8 depicts another exemplary array mode of minute convex lenses.

For example, lenses such as microlenses 9611 and 9621 of a microlens array 96 depicted in FIG. 8 have a vertically longer hexagonal shape similar to that of the microlens array 95 depicted in FIG. 5D.

The array of lenses including the microlens 9611 depicted in FIG. 8 is an "armchair type, vertically longer honeycomb array" similar to that in FIG. 5C.

The hexagonal shape of the lenses including the microlens 9611 is set such that effective pixel pitch X14 in X-axis direction is perfectly equal to effective pixel pitch Y14 in Y-axis direction.

In this manner, in the armchair type, vertically longer honeycomb array, the aspect ratio may be set to one. In case of minute convex lenses having a size that is larger than or approximately equal to the beam diameter of the pixel-displaying beam, if the aspect ratio of the effective pixel pitches is one, reproducibility by way of virtual images is enhanced with respect to the image data to be projected as such virtual images. This is because the pixel pitch on the microlens array of the image data to be projected as virtual images is matched with the effective pixel pitch, or the effective pixel pitch is brought closer to the pixel pitch on the microlens array of the image data to be projected as virtual images as compared to other effective pixel pitches.

In the foregoing, the vertical direction is described as the "up-down direction," and the lateral direction is described as the "right-left direction;" however, this is for the sake of convenience in terms of specificity.

The vertical direction in the actual space may be different depending on the direction in which the microlens array is installed in the image display apparatus or in which the image display apparatus is mounted to a moving body such as a vehicle.

The two-dimensional deflector 6 reciprocatingly swings a plurality of times with respect to one axis (swinging along a second axis) while reciprocatingly swinging with respect to the other axis (swinging along a first axis) one time. In many cases, X-axis direction, which is the longitudinal direction of the enlarged virtual image, is set as the direction in which scan is performed on the microlens array with the pixel-displaying beam LC by the swing along the second axis. Hence, the vertical sides of the "armchair type" hexagonal microlenses that are parallel along X-axis direction are approximately parallel to the direction in which scan is performed with the pixel-displaying beam LC on the microlens array. The "armchair type, vertically longer honeycomb structure" is formed by extending the distance between two sides that are the most parallel to the direction in which scan is performed on the "armchair type," hexagonal microlens array with the pixel-displaying beam, i.e., the distance between a side that is the most parallel to the direction in which scan is performed on the microlens array with the pixel-displaying beam and a side opposite thereto, into a direction orthogonal to these two sides.

Hence, the armchair type, vertically longer honeycomb array provides for improvement in brightness and increase in number of effective pixels, and besides for reduction in difference between the effective pixel pitch in X-axis direction (lateral direction) and the effective pixel pitch in Y-axis direction (vertical direction).

Any shape is selectable as the "shape of the minute convex lenses" as depicted in FIGS. 5C to 5E, for example, for controlling the angle of divergence of divergent light flux.

In the head-up display apparatus depicted in FIG. 1A, the pixel-displaying beam LC is orthogonally incident on the minute convex lens structure of the scanning target surface 8.

However, the mode of incidence of the pixel-displaying beam on the scanning target surface is not limited to such "orthogonal incidence."

Figure 7A:
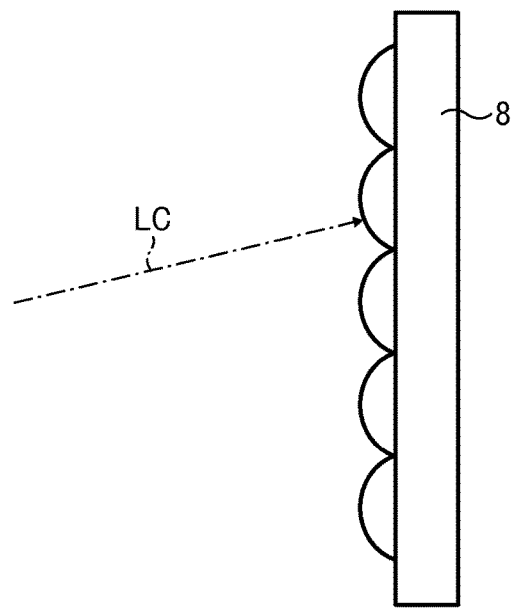
FIGS. 7A and 7B are explanatory diagrams of exemplary scanning target surfaces.

For example, a mode of incidence as in FIG. 7A is conceivable in case where the head-up display apparatus is downsized by cleverly aligning optical devices from the light source to the reflective surface.

Specifically, in the example of FIG. 7A, the pixel-displaying beam LC is incident on the scanning target surface 8 at an angle.

In case where the lens surfaces of the minute convex lenses are "aspherical surfaces," the pixel-displaying beam LC is incident at an angle with respect to the optical axis of the aspherical surfaces, which may impair the function of the aspherical surfaces.

Figure 7B:
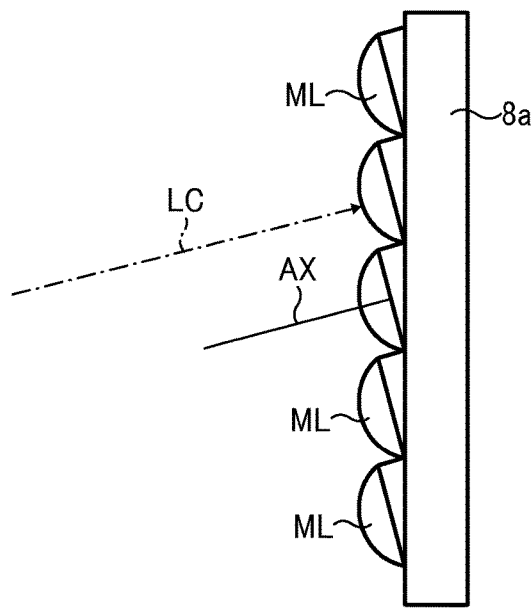

In such a case, like a scanning target surface 8a of FIG. 7B, lens surface optical axes AX of minute convex lenses ML are inclined with respect to a reference plane of the scanning target surface 8a from the orthogonal direction.

In this manner, lens surface optical axes AX are brought parallel to the direction of incidence of the pixel-displaying beam LC or closer to a direction parallel to the direction of incidence.

It is to be noted that the reference plane of the scanning target surface 8a is a surface on which the minute convex lenses ML are arranged in an array.

In this manner, miniaturization of optical systems and improvement in light use efficiency are achieved, such that the "directions in which the pixel-displaying beam is diverged by the minute convex lenses" are made uniform.

The head-up display apparatus described above may be mounted to not only the above-mentioned automobiles but also various operable moving bodies such as trains, vessels, helicopters, and airplanes. For example, the windshield of a motorcycle may be the transmission reflection member.

In this case, the glass portion in front of the driver's seat may be a reflective surface.

Obviously, the head-up display apparatus may be implemented as an "image display apparatus for movie viewing."

As described above, the minute convex lenses of the minute convex lens structure diffuse the pixel-displaying beam. It is also conceivable that the beam is diffused in one direction out of the two directions of X and Y directions.

In such a case, "minute convex cylinder surfaces" are applicable as the lens surfaces of the minute convex lenses.

It has been known that the shape of the minute convex lenses is defined hexagonal, and that the array of the lenses is configured as a honeycomb array, in association with methods of manufacturing microlens arrays.

The above-described head-up display apparatus may be adopted for, for example, an on-vehicle device for automobiles. In this case, X direction is the "lateral direction as viewed from the driver's seat," and Y direction is the "vertical direction."

The reflective surface 10 in this case is the windshield of an automobile.

In this case, for example, a "navigation image" is displayable as the enlarged virtual image 12 frontward on the windshield, allowing the driver, who is the observer 11, to observe the image while sitting on the driver's seat with the eyes almost fixed to the windshield in front of him/her.

In such a case, as described earlier, the enlarged virtual image to be displayed is desirably a "laterally longer image as viewed from the driver;" in other words, an image to be formed on the microlenses and the enlarged virtual image are generally desirably image with a larger angle of view in X direction, i.e., laterally longer images.

It has been known that the minute convex lenses (microlenses) may have "aspherical" lens "surfaces."

The lens surfaces of the minute convex lenses may be provided in the form of a more typical aspherical surface, such that aberration correction is performed as well.

Aberration correction allows an "irregularity in intensity of diffusion" to be reduced.

Incidentally, in order to improve the visibility of the virtual image at a predetermined observation location on the optical path of laser light reflected by the reflective surface 10, the cross section of the incoming laser light from the microlenses preferably has a desired size at the observation location. In other words, improvement in light use efficiency and optimization of brightness are desired. It is to be noted that larger the cross section of the laser light at the observation location, the less the brightness (mean energy density) is.

Moreover, the optical path of laser light typically has varied lengths between in-plane positions of the microlens array and the observation location, and hence at least two of the microlenses desirably have angles of divergence (minimum angle of divergence) different from each other.

Figure 9A:
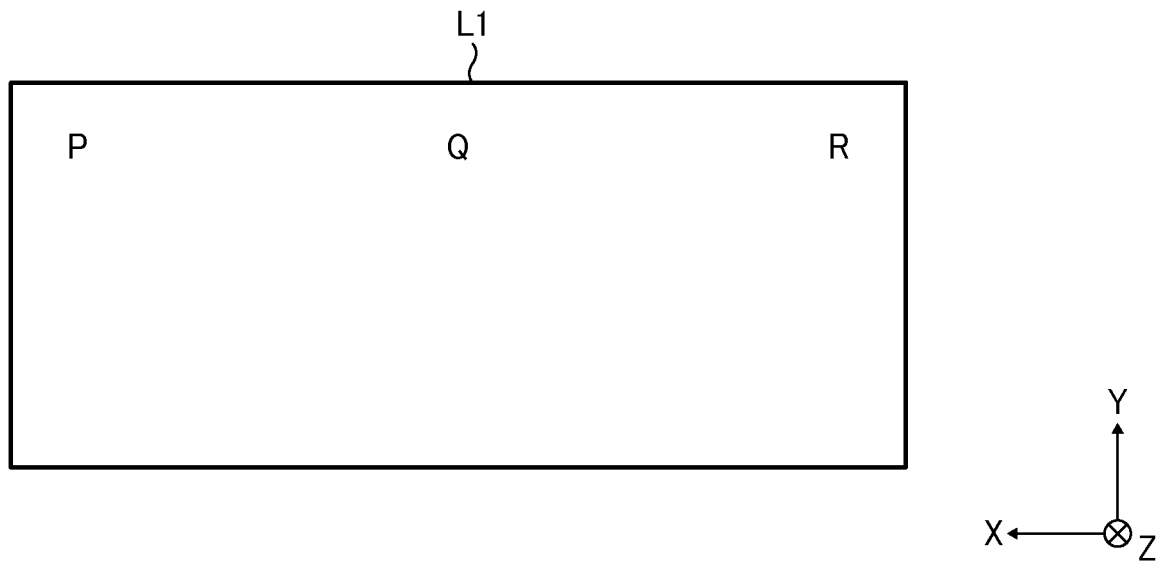
FIGS. 9A and 9B are explanatory diagrams of a microlens array according to a first embodiment.
Figure 9B:
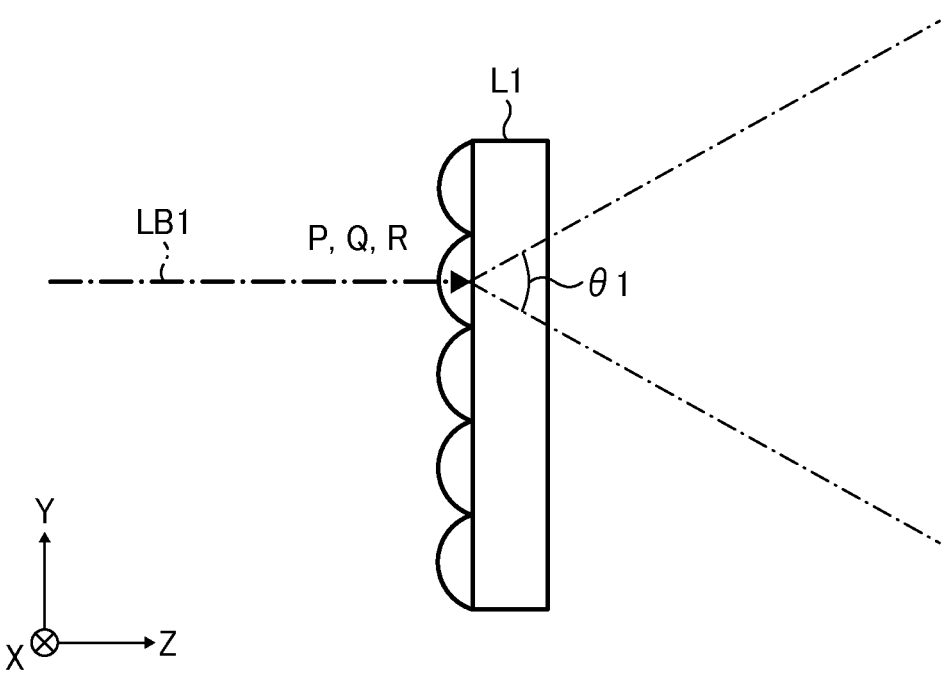

FIGS. 9A and 9B are explanatory diagrams of a microlens array (L1) of a first embodiment. The microlens array of the first embodiment has X direction as the longitudinal direction and is two-dimensionally scanned with a light flux beam LB1 in X and Y directions. Herein, the microlens array has a rectangular shape as viewed in Z-axis direction. Further, according to the first embodiment, optical systems are provided therein which are similar to the optical systems depicted in FIGS. 1A to 1C.

FIG. 9A depicts specific examples P, Q, and R of positions in the microlens array on which the light flux beam LB1 (see FIG. 9B) is incident.

Herein, the direction of incidence of the light flux beam LB1 is positive Z direction, and the direction in which the longer sides of the microlens array extend is X direction, and the direction in which the shorter sides thereof extend is Y direction.

In the microlens array of the first embodiment, the lens pitches and curvatures of a plurality of microlenses are equal to each other, i.e., the radii of curvature are equal to each other, and the angles at which laser light is diverged by the microlenses are equal to each other. Thus, the light flux beam LB1 that is incident on the microlens array in parallel is diverged at the same angle of divergence $\theta 1$ at, for example, the positions P, Q, and R in the microlens array, regardless of the positions with respect to X and Y (see FIG. 9B.) Angle of divergence $\theta 1$ is set, for example, according to a value corresponding to a mean value of the optical path lengths of laser light between each of the positions P, Q, and R and the observation location.

In this case, the laser light has cross-sectional sizes that are off the desired size at each of the positions P, Q, and R, leading to lowering of the use efficiency of light and brightness, due to a difference in optical path length of laser light between each of the positions P, Q, and R and the observation location.

Figure 10A:
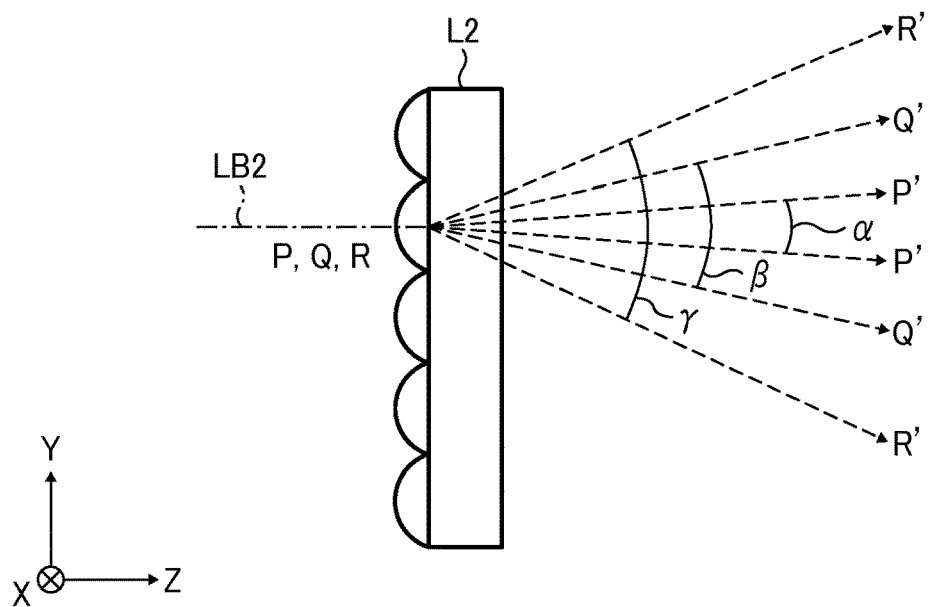
FIGS. 10A and 10B are explanatory diagrams of a microlens array according to a second embodiment.
Figure 10B:
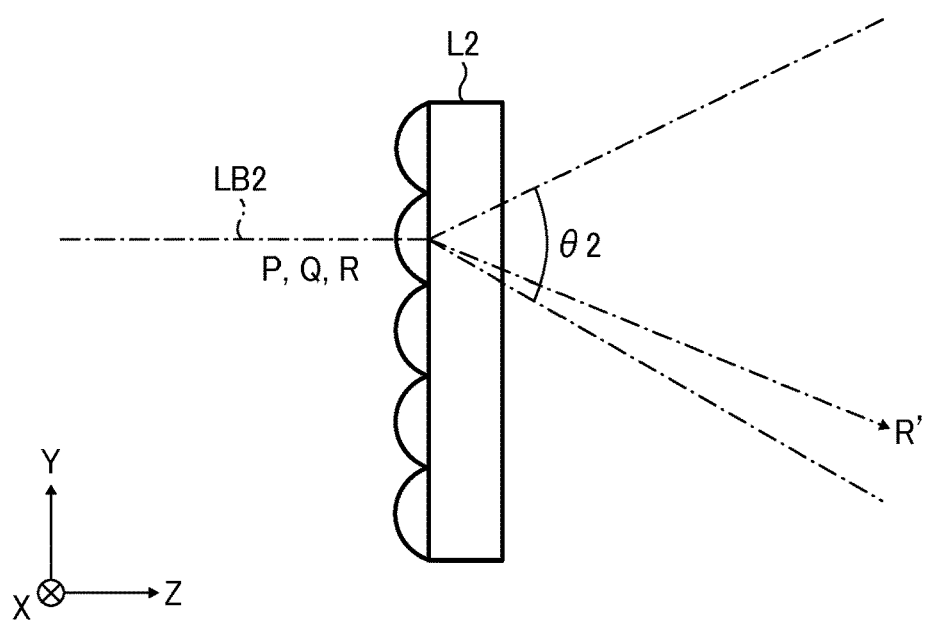

FIGS. 10A and 10B are explanatory diagram of a microlens array (L2) of a second embodiment. The microlens array of the second embodiment is the same in shape as the microlens array of the first embodiment and is two-dimensionally scanned with a light flux beam LB2 in X and Y directions. Further, according to the second embodiment also, optical systems are provided which are similar to the optical systems depicted in FIGS. 1A to 1C.

In the microlens array of the second embodiment, angles of divergence are desirably $\alpha$, $\beta$, and $\gamma$ ($\alpha<\beta<\gamma$) at the positions P, Q, and R (see FIG. 9A), respectively. However, according to the second embodiment, since the design concept is such that the light flux beam LB2 is diverged by the microlenses at an equal angle of divergence as in the first embodiment, the angle of divergence is set to the largest $\gamma$ of $\alpha$, $\beta$ and $\gamma$. In other words, the curvature (radius of curvature) of each microlens is set to a value that renders the angle of divergence become $\gamma$.

In this case, the desired angle of divergence is attained at each of the positions P, Q, and R.

However, since the angles of divergence at the positions P and Q are matched to the angle of divergence $\gamma$ at the position R, the incident light flux is diverged at an angle of divergence that is larger than the originally desired angle of divergence at the positions P and Q. As a result, a portion of the light flux incident on the microlens array is diverged more than expected, inviting lowering of light use efficiency and brightness.

In view of the above, according to a third embodiment to be described below, the angle of divergence of incident light flux is made different depending on in-plane positions on the microlens array.

Figure 11A:
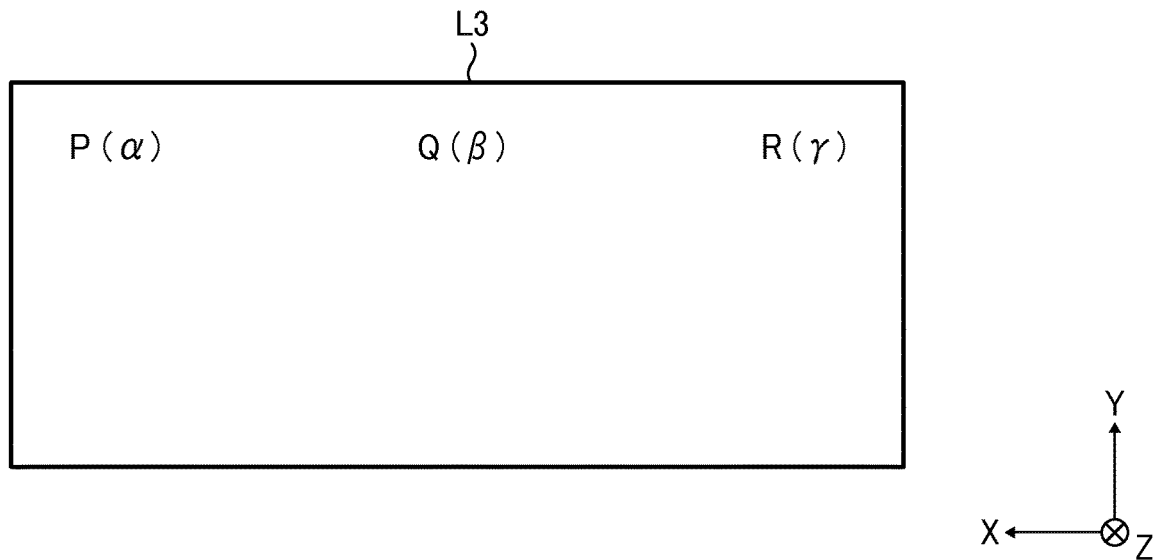
FIGS. 11A-11C are explanatory diagrams of a microlens array according to a third embodiment.
Figure 11B:
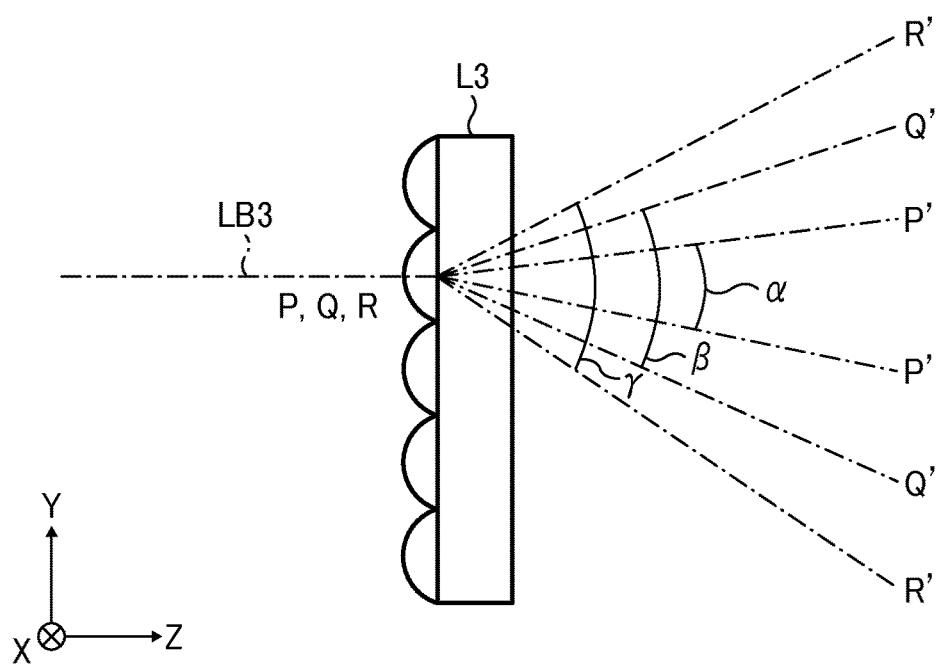
Figure 11C:
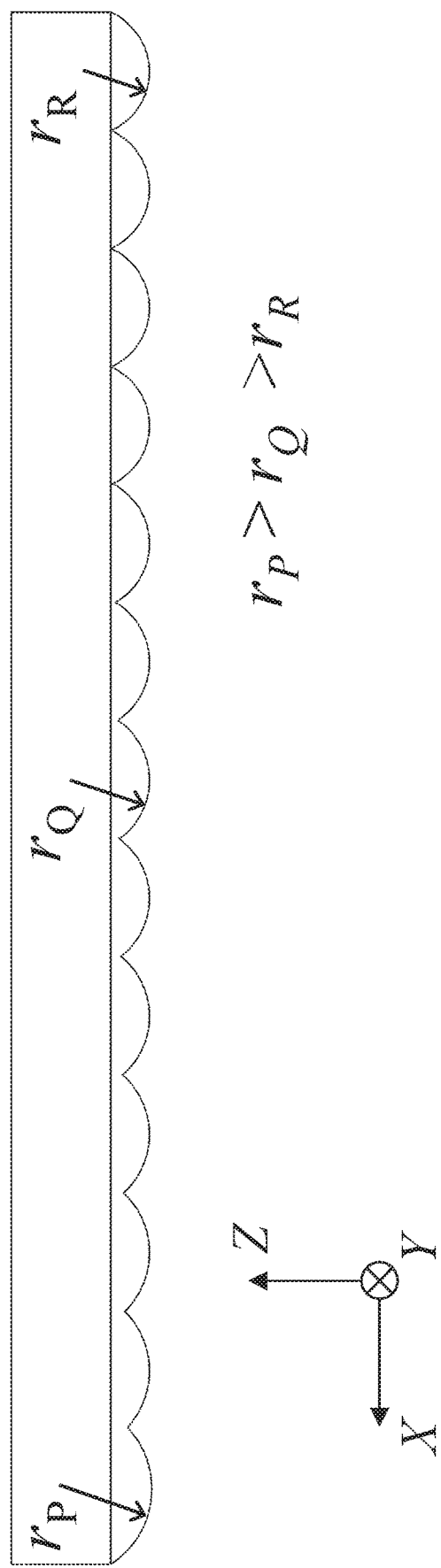

FIGS. 11A-11C are explanatory diagrams of a microlens array (L3) of the third embodiment. The microlens array of the third embodiment is the same in shape as the microlens arrays of the first and second embodiments and is two-dimensionally scanned (e.g., raster scan) with a light flux beam LB3 in X and Y directions.

According to the third embodiment, the angles of divergence of the light flux beam LB3 incident on the positions P, Q, and R are set to angles of divergence $\alpha$, $\beta$, and $\gamma$ ($\alpha<\beta<\gamma$) that are desired for each position. It is to be noted that the desired angles of divergence are determined, for example, according to the optical path lengths between in-plane positions on the microlens array (the microlenses) and the observation location, and the direction in which the incoming laser light from the reflective surface 10 is reflected, i.e., the direction in which the laser light is incident on the observer eye.

In other words, the longer the optical path length of laser light from the microlenses to the reflective surface 10, and further to the observation location, the greater the diverging effect of the microlenses is. Meanwhile, the shorter the optical path length of laser light from the microlenses to the reflective surface 10, and further to the observation location, the less diverging effect of the microlenses is. Hence, for example, if a constant diverging effect of the microlenses is desired at the observation location regardless of the optical path length from the microlenses to the reflective surface 10, the microlenses may be each distributed such that the lenses having shorter optical path lengths to the reflective surface 10 have larger curvatures. In other words, where the microlens array is equally divided into an area with longer optical path lengths to the reflective surface 10 and an area with shorter optical path lengths to the reflective surface 10, the microlenses may have a larger mean curvature in the area with the shorter optical path lengths than in the area with the longer optical path lengths. As another mode of the above configuration, if different diverging effects are desired for each area on the microlens array, the distribution of radii of curvature in the microlens array may be determined accordingly.

In the above case, the distribution of curvatures of the microlenses in the microlens array exhibits approximately monotonous decrease from the area occupied by larger curvatures toward the area occupied by smaller curvatures.

In this manner, the angle of divergence is set to a minimum value at each in-plane position, such that incident light flux is diverged without loss. This improves light use efficiency and enhances the brightness.

The microlens array having angles of divergence different by in-plane position as described above is actually fabricable (see, for example, JP-2009-111209-A.) The angle of divergence at each in-plane position on the microlens array is controllable by way of the lens pitches in the microlens array and the radius of curvature of each microlens. In this regard, the radii of curvature of a plurality of microlenses may be changed according to the lens pitches so as to establish a positional function of X and Y.

As described above, according to the present embodiments (first to third embodiments), the radius of curvature of each microlens of the microlens array is set based on the optical path length of laser light between the microlens and the reflective surface 10. Specifically, the radius of curvature of the microlens is set larger, i.e., the curvature is set smaller, as the optical path length of laser light from each microlens to the reflective surface 10 is longer. To put it in an opposite way, the radius of curvature of the microlens is set smaller, i.e., the curvature is set larger, as the optical path length of laser light from each microlens to the reflective surface 10 is shorter. It is to be noted that the curvature of each microlens may be set based on the direction in which the laser light is reflected from the reflective surface 10, instead of or in addition to the above-described optical path length.

As described earlier, typically, the optical path of laser light has lengths different from each other between a first one of at least two of the entire microlenses and the observation location, and a second one of the at least two of the microlenses and the observation location. In other words, it is extremely rare that the optical path of laser light has a uniform length between each one of the microlenses of the microlens array and the observation location.

Accordingly, in the microlens arrays of the present embodiments, at least two microlenses have radii of curvature different from each other $r_P>r_O>r_R$ (FIG. 11C). In other words, the microlens arrays have in-plane distribution of radii of curvature.

Figure 12A:
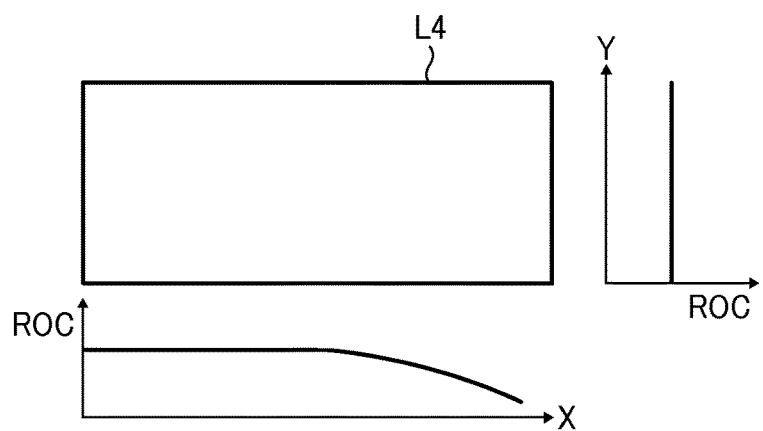
FIGS. 12A to 12C depict in-plane distributions of radii of curvature of microlens arrays according to fourth to sixth embodiments.
Figure 12B:
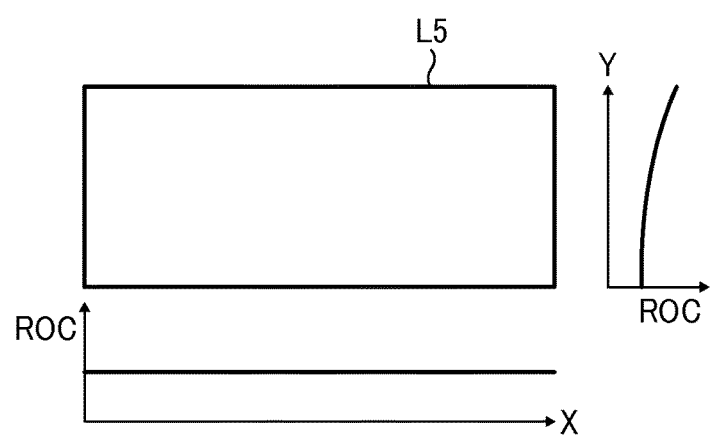
Figure 12C:
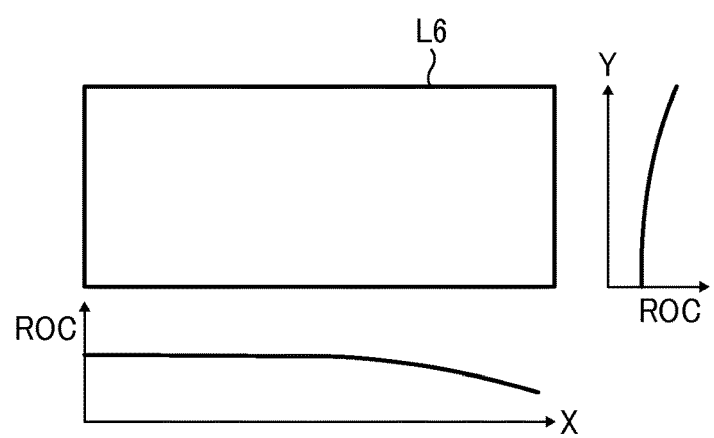

Various modes are conceivable as modes of distribution of radii of curvature. For example, such modes include a mode such as a microlens array of a fourth embodiment depicted in FIG. 12A having a distribution in X direction (the longer-side direction) and not in Y direction (shorter-side direction), and a mode such as a microlens array of a fifth embodiment as depicted in FIG. 12B having a distribution in Y direction (shorter-side direction), and a mode such as a microlens array of a sixth embodiment as depicted in FIG. 12C having distributions of radii of curvature both in X and Y directions.

The foregoing discussion centers on the radius of curvature of the microlenses and thus stands true not only in case where the microlenses have a circular or regular polygonal shape but also in case where the microlenses have a different aspect ratio, such as a rectangular shape or oval shape.

Figure 13:
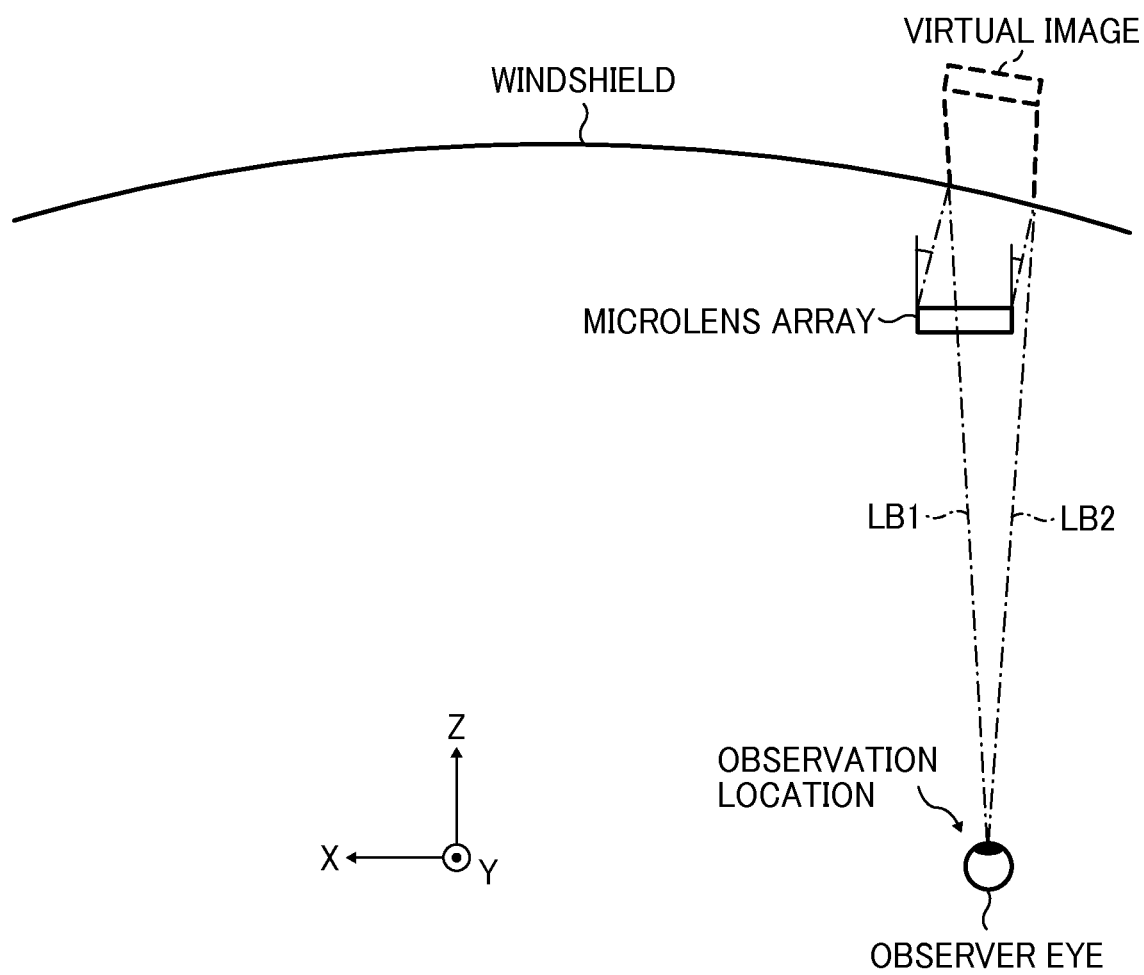
FIG. 13 is an explanatory diagram of laser light to reach an observer eye from a microlens array through a windshield.

FIG. 13 is an explanatory diagram of a case in which the virtual image of an image formed on the microlens array is made visible by a transmission reflection member (e.g., the windshield of a moving body) that is asymmetrical with respect to the vertical plane including the observer eye.

In FIG. 13, the vertical direction is Y direction, and a direction that is parallel to the horizontal plane and is also parallel to the observer eye is Z direction.

A portion of the laser light transmitted by the microlens array is reflected by the transmission reflection member in the form of the reflective surface 10, so as to be sent to the position of the observer eye. The observer then perceives the image formed on the microlens array as a virtual image.

For example, the windshield of a vehicle is conceived as the transmission reflection member. In a normal vehicle, the observer (driver) observes a virtual image at the observation location, which is the position of the driver's seat that is to the right or left with respect to the center of the windshield. In FIG. 13, a vehicle with a right steering wheel is assumed. The windshield has a shape asymmetrical with respect to the vertical plane (Y-Z plane) including the observer eye.

Due to the effect of the shape of the windshield (e.g., a curved shape), the optical path lengths between each of the microlenses of the microlens array and the windshield have a distribution with respect to X direction. Further, the optical path lengths of laser light from each microlens also have a distribution with respect to X direction between the position of incidence on the windshield and the observer eye.

For this reason, for example, optical path lengths are different from each other between two light beams 1 and 2 that are emitted from two ends along X direction of the microlens array, are reflected by the windshield, and reach the observer eye. The two light beams 1 and 2 are also different from each other in direction in which the light beams are reflected by the windshield.

In case where optical systems positioned between the microlens array and the observer are asymmetrically configured as described above, desired angles of divergence are different for each in-plane position on the microlens array; thus, in order to attain the desired angle of divergence at each in-plane position, the radii of curvature are desirably distributed along X direction in the microlens array based on the optical path lengths of the two light beams 1 and 2 and the directions in which the light beams are reflected by the windshield, i.e., radii of curvature of at least two microlenses arranged in X direction are defined desirably differently.

In the foregoing, description is given of difference in optical path due to asymmetry of optical systems with respect to the right-left direction for the observer (lateral direction), i.e., the longitudinal direction of the microlens array (X direction). However, windshields have an asymmetric shape also in Y direction, i.e., the shorter-side direction of the microlens array in many cases, and the above discussion stands true for such a case. In this respect, the radii of curvature are desirably distributed along Y direction in the microlens array based on the optical path lengths of the above-described two light beams 1 and 2 and the directions in which the light beams are reflected by the windshield, i.e., radii of curvature of at least two microlenses arranged in Y direction are defined desirably differently.

As will be understood from the foregoing description, the curvatures of a plurality of microlenses are desirably set based on the positional relationship between the microlens array and the transmission reflection member, as well as the positional relationship between a predetermined observation location at which the eye of the observer (e.g., the operator sitting at the operator's seat) is located and the transmission reflection member. This is achieved, for example, by preliminarily setting a spatial domain that is assumed to have the observer eye located therein and defining the set spatial domain as the observation location. Further, for example in FIG. 13, the observation location may also be set to a planar domain in which the optical path of laser light reflected by the transmission reflection member crosses a predetermined plane that is parallel to X-Y plane, in which planar domain the observer eye is presumably located. Further, the observation location may be set to a certain point (e.g., the central point) in the spatial domain or the planar domain in which the observer eye is presumably located. It is to be noted however that the above spatial domain and planar domain are desirably set slightly larger considering individual differences such as the physique of the observer or positional change of the head of the observer while observing the virtual image.

In other words, the curvature of each of the plurality of microlenses is desirably set based on the optical path length of laser light between the microlenses and the above-described observation location, i.e., the optical path length of laser light reaching the observation location from each microlens through the transmission reflection member.

Specifically, the longer the optical path length of laser light between each microlens and the above-described observation location, the smaller the curvature of the microlens is set, i.e., the larger the radius of curvature is set, so as to reduce the angle of divergence of the laser light. To put is in an opposite way, the shorter the optical path length of laser light between each microlens and the above-described observation location, the larger the curvature of the microlens is set, i.e., the smaller the radius of curvature is set, so as to enlarge the angle of divergence of the laser light. In this case, for example, cross-sectional sizes of laser light from each microlens are desirably approximately equalized at the observation location.

In this manner, minimum angles of divergence are attained in accordance with the optical path length of laser light between each microlens and the above-mentioned predetermined position, and light use efficiency and brightness are enhanced. It is to be noted that the respective curvatures of the plurality of microlenses may be set based on the result of measurement obtained by actually measuring the optical path length of laser light between the microlens and the above-mentioned predetermined position by using, for example, a laser length measuring machine.

It is to be noted that the optical path length of laser light between each microlens and the transmission reflection member is determined depending on the positional relationship between the microlens array and the transmission reflection member. Further, the optical path length of laser light transmitted by each microlens between the transmission reflection member and the above-described observation location is determined depending on the positional relationship between the above-described observation location and the transmission reflection member.

It is to be noted that the curvature of each microlens may be set based on the direction of reflection of the laser light that is transmitted by the microlens and is reflected by the transmission reflection member, i.e., the direction in which the principal beam of the reflected light proceeds. Specifically, for example, the curvatures of the microlenses may be set smaller and the angles of divergence may be set smaller as the direction of reflection of laser light is such a direction that the laser light is incident on the observer eye, who is straightly looking at the windshield, at a larger incidence angle (e.g., an angle formed with the gaze of the observer.) As a result, lowering of intensity of light reaching the observer eye is suppressed, and visibility of virtual images is improved. It is to be noted that where the angles of divergence are under the same condition, the cross section of light incident on the observer eye is larger as the incidence angle of the laser light on the observer eye is larger. Thus, even though the angle of divergence is reduced, narrowing of the viewing angle is inhibited. The direction in which laser light is reflected from the transmission reflection member is found based on the direction in which the laser light is incident on the transmission reflection member.

Further, in the above-described embodiments, the directions in which light is emitted from the microlenses, i.e., the optical axes of the microlenses, are parallel to each other; however, the directions in which light is emitted from at least two microlenses may be set non-parallel. It is to be noted that adjustment of orientations of the optical axes of the microlenses allows for adjustment of the optical path lengths and directions of reflection of the laser light that is transmitted by the microlenses and is reflected by the transmission reflection member.

Further, the curvatures of the microlenses of the microlens array may be entirely different from each other; alternatively, the curvatures of a portion of the microlenses may be different, and the curvatures of the remaining microlenses may be the same. In short, the curvatures of at least two microlenses are different.

In other words, the curvatures of a plurality of microlenses including the microlens array are two kinds or more, and the curvatures are distributed within the plane of the microlens array based on the layout of the optical systems and the observation location. In this manner, the angles of divergence at in-plane positions are set minimum.

As has been described above, in the present embodiments, light is diverged in a minimum range for attaining the desired angle of view of the head-up display apparatus, thus improving light use efficiency and enhancing the brightness of virtual images. Thus, in the moving body mounting this head-up display apparatus, the operator quickly and reliably recognize the virtual images of navigation images.

In the microlens arrays of the foregoing embodiments, a plurality of microlenses is two-dimensionally arranged. In place of this configuration, the microlenses may be one-dimensionally arranged or three-dimensionally arranged.

In the foregoing embodiments, the microlens arrays are two-dimensionally scanned by using the two-dimensional deflector to form a two-dimensional image; however, the microlens array may be one-dimensionally scanned by using, for example, a one-dimensional deflector including an MEMS mirror, a galvanometer-driven mirror, and a polygon mirror to form a one-dimensional image.

Further, in the foregoing embodiments, color images are formed, but monochrome images may be formed as well.

Further, the transmission reflection member in the form of the reflective surface 10 may, for example, include a member other than the windshield of a moving body, like a combiner, and may be located at the observer's side from the windshield.

Further, the transmission reflection member is not limited to the windshield of a moving body and may also be, for example, a side glass or a rear glass. In short, the transmission reflection member may be a window member that is disposed in a moving body to be operated by an operator who sees the virtual image, and that allows the operator to see the outside of the moving body.

Further, the target audience to whom the virtual image is made visible by the image display apparatus is not limited to the operator of a moving body and may also be, for example, a navigator or a passenger boarding the moving body.

The image display apparatus of any of the present embodiments described above scans a microlens array including a plurality of microlenses with laser light that is modulated in accordance with image information so as to form an image. The image display apparatus allows the laser light transmitted by the microlens array to be incident on a transmission reflection member, such that a virtual image of the image is visualized at an observation location on the optical path of the laser light reflected by the transmission reflection member. The curvature of each of the plurality of microlenses is set based on the optical path length of the laser light between the microlens and the observation location.

In this case, the curvature of each of the plurality of microlenses may be set such that the angle of divergence of the laser light from the microlens takes an appropriate value adjusted to the optical length.

As a result, light use efficiency is improved, and hence the visibility of virtual images is enhanced.

It is to be noted that in the foregoing embodiments, description is given of setting of the radius of curvature of each microlens of isotropic diffusion type based on the optical length of laser light between the microlens and the observation location; however, the radius of curvature of each microlens of the earlier-described anisotropic diffusion type may be set based on the optical path length of laser light between the microlens and the observation location. In case of the microlenses of anisotropic diffusion type, the radii of curvature of the microlenses may be adjusted in X and Y directions at mutually equal magnifications like the microlenses of isotropic diffusion type; alternatively, the adjustment may be performed at magnifications not equal to each other.

It is to be noted that at least one of the curvatures of each of the plurality of microlenses in first and second directions orthogonal to each other (e.g., X and Y directions) may be set based on the optical path length of laser light between the microlens and the above-described observation location.

In this case, an appropriate value that is adjusted to the optical path length of laser light between each microlens and the observation location may be adopted for setting at least one of the angles of divergence of the laser light with respect to the first and second directions (e.g., X and Y directions), the divergence being caused by of the microlens. As a result, not only the size but also the shape of the cross section of each laser light beam are adjusted at the observation location.

This setting is effective in case where different angles of divergence are desired for the angle of divergence with respect to each of the first and second directions (e.g., X and Y directions), or in case of a design concept in which the radii of curvature are different from each other with respect to the first and second directions of each microlens in the microlens array (in case where the microlenses are of anisotropic diffusion type.)

Further, at least one of the curvatures with respect to the above-described first and second directions may be set based on the direction of reflection of laser light that is transmitted by the microlens and is reflected by the transmission reflection member.

Further, the image display apparatus according to embodiments of the present invention is applicable to, for example, a head-mount display mountable to the head of the observer.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

For example, the present invention may reside in an image display apparatus configured such that a microlens array including a plurality of microlenses is irradiated with laser light to form an image, the laser light being modulated in accordance with image information, and that a transmission reflection member allows the laser light transmitted by the microlens array to be incident thereon, in such a manner as to visualize a virtual image of the image at an observation location on an optical path of the laser light reflected by the transmission reflection member. At least one of curvatures of each of the plurality of microlenses in a first direction and a second direction is set based on a length of the optical path of the laser light between the microlens and the observation location, the first and second directions being orthogonal to each other.

Further, the lengths of the optical paths of the laser light are different from each other between each of at least two microlenses of the plurality of microlenses and the observation location.

What is claimed is:

1. An image display apparatus comprising:
    a light source configured to emit light;
    a lens array including a plurality of lenses two-dimensionally arranged therein at a pitch equal to or larger than a beam diameter of the emitted light, at least two of the plurality of lenses having curvatures different from each other; and
    an image forming device configured to form an image with the emitted light on the lens array, wherein the light corresponding to the formed image is transmitted from the lens array to be reflected by a reflective surface to visualize the formed image into a virtual image.

2. The image display apparatus according to claim 1, wherein the plurality of lenses is each distributed in such a manner that the lenses having shorter optical path lengths to the reflective surface have larger curvatures.

3. The image display apparatus according to claim 1, wherein the plurality of lenses are each distributed in such a manner that, where the lens array is equally divided into an area with longer optical path lengths to the reflective surface and an area with shorter optical path lengths to the reflective surface, the lenses in the area with the shorter optical path lengths are larger in mean curvature as compared to the lenses in the area with the longer optical path lengths.

4. The image display apparatus according to claim 1, further comprising:
    a reflective member positioned on an optical path of light between the lens array and the reflective surface and configured to reflect the light while enlarging to form an enlarged virtual image.

5. The image display apparatus according to claim 1, wherein the reflective surface is disposed in a moving body configured to be operated by an operator to see the virtual image, and the reflective surface is a window member that forms an exterior surface of the moving body.

6. A moving body mounting the image display apparatus of claim 5, the moving body being configured to be operated by the operator.

7. The image display apparatus according to claim 1, wherein the virtual image is visualized at an observation location on an optical path of the light reflected by the reflection surface,
    wherein at least one of curvatures of each of the plurality of lenses in a first direction and a second direction is set based on a length of the optical path of the light between the lens and the observation location, the first and second directions being orthogonal to each other.

8. The image display apparatus according to claim 7, wherein the lengths of the optical paths of the light are different from each other between each of at least two lenses of the plurality of lenses and the observation location.

9. The image display apparatus according to claim 1, wherein the lens array is a microlens array including a plurality of microlens arrays.

10. The image display apparatus according to claim 1, further comprising a concave mirror disposed between the lens array and the reflective surface.

11. The image display apparatus according to claim 1, wherein a radius of curvature a border portion between adjacent lenses is smaller than wavelength A of the emitted light.

12. A lens array provided in an image display apparatus, comprising a plurality of lenses two-dimensionally arranged therein at a pitch equal to or larger than a beam diameter of emitted light received by the lens array,
    wherein at least two of the plurality of lenses have curvatures different from each other.

13. The lens array according to claim 12, wherein curvatures of the plurality of lenses are distributed in such a manner that the curvatures present an approximately monotonic reduction from an area occupied by larger curvatures toward an area occupied by smaller curvatures.

14. The lens array according to claim 12, wherein a radius of curvature a border portion between adjacent lenses is smaller than wavelength A of the emitted light.

15. A lens array in an image display apparatus, the lens array comprising a plurality of lenses two-dimensionally arranged therein at a pitch equal to or larger than a beam diameter of light incident on the lens array, each of the plurality of lenses having a curvature,
    wherein the curvatures of the plurality of lenses are at least one of increasing and decreasing within the lens array.

16. The lens array according to claim 15, wherein curvatures of the plurality of lenses are distributed in such a manner that the curvatures present an approximately monotonic reduction from an area occupied by larger curvatures toward an area occupied by smaller curvatures.

* * * * *